(12) United States Patent
Ramer et al.

(10) Patent No.: US 8,779,669 B2
(45) Date of Patent: Jul. 15, 2014

(54) CHAOTIC APPROACH TO CONTROL OF LIGHTING

(75) Inventors: David P. Ramer, Reston, VA (US); Jack C. Rains, Jr., Herndon, VA (US)

(73) Assignee: ABL IP Holding LLC, Conyers, GA (US)

( * ) Notice: Subject to any disclaimer, the term of this patent is extended or adjusted under 35 U.S.C. 154(b) by 168 days.

(21) Appl. No.: 13/594,206

(22) Filed: Aug. 24, 2012

(65) Prior Publication Data

US 2014/0055041 A1    Feb. 27, 2014

(51) Int. Cl.
*H05B 37/02* (2006.01)

(52) U.S. Cl.
USPC .......................................... 315/153; 315/297

(58) Field of Classification Search
None
See application file for complete search history.

(56) References Cited

U.S. PATENT DOCUMENTS

| | | | |
|---|---|---|---|
| 6,542,077 B2* | 4/2003 | Joao | 340/426.16 |
| 7,990,252 B2* | 8/2011 | Barton | 340/333 |
| 8,519,566 B2* | 8/2013 | Recker et al. | 307/64 |
| 2003/0151501 A1* | 8/2003 | Teckchandani et al. | 340/426.19 |
| 2004/0212309 A1* | 10/2004 | St.-Germain | 315/76 |
| 2009/0045748 A1* | 2/2009 | You | 315/86 |
| 2010/0141153 A1* | 6/2010 | Recker et al. | 315/149 |
| 2010/0327766 A1* | 12/2010 | Recker et al. | 315/291 |
| 2011/0133649 A1* | 6/2011 | Kreiner et al. | 315/86 |
| 2011/0133655 A1* | 6/2011 | Recker et al. | 315/159 |
| 2012/0169490 A1* | 7/2012 | Yu et al. | 340/522 |

OTHER PUBLICATIONS

"Circadian rhythm," Wikipedia, <http://en.wikipedia.org/wiki/Circadian_rhythm>, Retrieved on May 9, 2012.
"Chaos theory", Whatis.com, <http://whatis.techtarget.com/definition/chaos-theory?vgnextfmt=print>, Retrieved Jul. 17, 2012.
"Chaos theory," Wikipedia, <http://en.wikipedia.org/wiki/Chaos_theory>, Retrieved on Jul. 17, 2012.

* cited by examiner

*Primary Examiner* — Crystal L Hammond
(74) *Attorney, Agent, or Firm* — RatnerPrestia

(57) ABSTRACT

At least one controllable source of visible light is configured to illuminate a space to be utilized by one or more occupants. A controller causes the source(s) to emit light in a manner that varies at least one characteristic of visible light emitted into the space over a period of time at least in part in accordance with a chaotic function.

26 Claims, 12 Drawing Sheets r=3.5 r=4.0

Chaotic Equation sine Equation sine Equation * (1-Chaotic Equation*D)

Where D equals dampening function constant

High-frequency Chaotic Equation

Low-frequency Chaotic Equation

Combined with damping

CHAOTIC APPROACH TO CONTROL OF LIGHTING

RELATED APPLICATION

This application is related to U.S. Utility patent application Ser. No. 13/594,236 Filed Aug. 24, 2012 entitled "ENVIRONMENTAL CONTROL USING A CHAOTIC FUNCTION," the disclosure of which is entirely incorporated herein by reference.

TECHNICAL FIELD

The present subject matter relates to techniques and equipment to control one or more characteristics of lighting utilizing a chaotic function.

BACKGROUND

Electrical lighting has become commonplace in modern society. Electrical lighting devices are commonly deployed, for example, in homes and buildings of commercial and other enterprise establishments. Traditional general lighting devices have tended to be relatively dumb, in that they can be turned ON and OFF, and in some cases may be dimmed, usually in response to user activation of a relatively simple input device. Such lighting devices have also been controlled in response to ambient light detectors that turn on a light only when ambient light is at or below a threshold (e.g. as the sun goes down) and in response to occupancy sensors (e.g. to turn on light when a room is occupied and to turn the light off when the room is no longer occupied for some period). Often such devices are controlled individually or as relatively small groups at separate locations.

With the advent of modern electronics has come advancement both in the types of light sources and in the control capabilities of the lighting devices. For example, solid state sources are now becoming a commercially viable alternative to traditional light sources such as incandescent and fluorescent lamps. By nature, solid state light sources such as light emitting diodes (LEDs) and organic LEDs (OLEDs) are easily controlled by electronic logic circuits or processors. For example, many fixtures or systems using solid state light sources enable control of both intensity and color characteristics of the overall light output. Electronic controls have also been developed for other types of light sources.

Traditional control algorithms involved setting a condition or parameter of the light output, such as intensity and/or color and then maintaining the set condition within some minimal variance for a relatively long period of time, e.g. over a work day or a period occupancy. Advanced electronics in the control elements, however, have facilitated more sophisticated control algorithms. For example, some systems have been configured to vary a condition of lighting in accordance with a circadian rhythm. A circadian rhythm is a biological function that corresponds to a natural 24 hour cycle. For lighting purposes, lighting in an office or the like has been controlled in a manner to simulate variations of natural daylight over some portion of the daytime during which the office is expected to be occupied, so as to simulate that portion of the natural 24 hour cycle of sunlight.

Control algorithms based in whole in part on a circadian rhythm may help to promote harmony of the occupants with the lighted environment. However, such algorithms are still somewhat limited in that they tend to follow a general trend, such as average intensity of daylight, over the relevant period of the day.

The Fraunhofer Institute developed a Virtual Sky® in the form of a ceiling grid that was illuminated to appear as a moving sky with variable light intensity and sky colors. However, this approach is essentially an emulation of a natural environmental condition not specifically configured to manipulate the environment to influence an occupant's sense of being. Also, such a lighting grid is far too complex and expensive for wide adoption in environments for typical spaces intended for human occupancy, such as homes, offices, agricultural buildings, commercial buildings or the like.

Other types of lighting have been controlled in response to various conditions or inputs, for example, in response to music. At least some musical sound may be considered chaotic. However, lighting in response to or coordinated with music has been intended for special effects lighting or entertainment and not for control of general lighting such as task lighting in an enterprise or residential space.

Hence, there is room for still further improvement in a lighting control algorithm to better promote an objective purpose of an illuminated area or space when occupied, and/or which can be implemented using devices or systems for general lighting that are readily adaptable to environments for typical spaces, such as homes, offices, agricultural buildings, commercial buildings or the like.

SUMMARY

The concepts disclosed herein improve controlled lighting by introducing controlled variation of one or more characteristics of light in a chaotic manner.

In the examples discussed below, a lighting device includes at least one controllable source of visible light, to illuminate a space to be utilized by one or more biological occupants. A controller is coupled to the source or sources to control operation thereof. The operational control causes the source(s) to emit light in a manner that varies at least one characteristic of visible light emitted into the space over a period of time at least in part in accordance with a chaotic function.

Many natural environmental conditions, including natural lighting, are chaotic systems. The human nervous system is a chaotic system, which is at least somewhat attuned to chaotic inputs from the natural environment. Adding a chaotic variation to lighting of an inhabited space or region, as in the examples discussed in the detailed description, may help to liven up or put life (dynamic change) in the lighting of the space or region, as perceived by a person occupying the space. For example, the variation in lighting may effect perception by an occupant in a manner that promotes an objective purpose of the space, although the variation may or may not mimic naturally occurring variations in daylight. The impact of the chaotic functional control often is positive; but under some circumstances, the impact may be negative, e.g. to discomfort an unwanted visitor or intruder. In the specific examples, the expected occupants are human; however, the technologies discussed in the examples may be applied to control lighting of spaces intended for other biological occupants in addition to or instead of humans.

The examples described in more detail below include individual light fixtures as well as lighting systems utilizing a number of fixtures or other types of lighting devices, configured to implement chaotic function control of the type discussed herein. The concepts may be implemented in new light fixtures, devices or systems. Alternatively, the chaotic function control may be retrofitted into an existing device, fixture or system, for example, by updating the control program for the relevant controller(s), in which case relevant control functions may be embodied in programming.

The examples described below also encompass methods. Such a method may involve operating an electrically driven source to produce visible light, to illuminate a space to be utilized by one or more biological occupants. The operating step is controlled so as to vary at least one characteristic of the visible light from the source over a period of time at least in part in accordance with a chaotic function.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may, be practiced without such details. In other instances, well known methods, procedures, components, and/or circuitry have been described at a relatively high-level, without detail, in order to avoid unnecessarily obscuring aspects of the present teachings.

The various examples disclosed herein relate to lighting devices, fixtures or systems and ways to control such equipment to provide controlled variation of one or more characteristics of emitted light in a chaotic manner. Reference now is made in detail to the examples illustrated in the accompanying drawings and discussed below.

Figure 1:
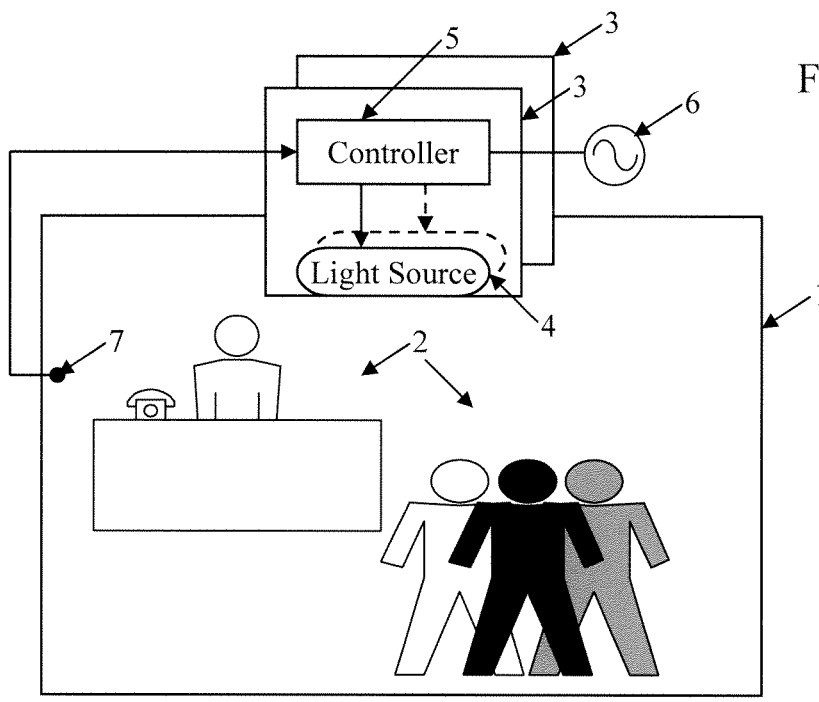
FIG. 1 is a simplified diagram showing an example of a number of lighting devices illuminating a space to be utilized by one or more occupants, where the lighting devices are configured to vary operation of the light source(s) so as to vary at least one characteristic of visible light emitted into the space over a period of time at least in part in accordance with a chaotic function.

FIG. 1 illustrates a simple first example. The drawing shows a region or space 1, which is intended to be utilized by one or more occupants 2. In the specific example, the occupants shown are human. However, the lighting control technology may be applied to light spaces intended for other biological occupants in addition to or instead of humans. For purposes of illustration and further discussion of the examples, we will assume human occupancy. The space 1, for example, may be a room in a building; although the lighting techniques under consideration here may be applied to any indoor or outdoor region or space that requires at least some artificial lighting. The lighting equipment involved here provides the main artificial illumination component in the space, rather than ancillary light output as might be provided by a display, or by or in association with a sound system, or the like. As such, the illumination from the fixtures, lamps or other elements controlled in accordance with a chaotic function is the main artificial illumination that supports the purpose of the space, for example, the lighting that alone or in combination with natural lighting provides light sufficient to allow occupants in the space to perform the normally expected task or tasks associated with the planned usage of the space. Often, such lighting is referred to as "general" lighting.

Human habitation often requires augmentation of natural ambient lighting with artificial lighting. For example, many office spaces, commercial spaces and/or manufacturing spaces require task lighting even when substantial amounts of natural ambient lighting are available. For many of these uses, the level of the light may be specified by one or more regulatory authorities. Hence, when natural ambient light is available, ambient and task lighting should be integrated such that they do not work against one another. For example, natural ambient lighting should not be distracting to the task(s) to be performed in the lighted space. An example is discussed later that utilizes ambient light sensing, that includes sensing of any natural ambient light or the like that may be available, to adjust the control of the artificial lighting device(s). Ambient light sensing detects at least some light that is present in the space even if the controlled artificial lighting were absent or turned OFF; although depending on the sensor/detector configuration, some of the controlled artificial lighting may also be detected. For ease of illustration and discussion, however, this initial example assumes only artificial lighting.

Hence, in our first example, the space 1 is an enclosed room or the like and is shown without windows or any other means of providing daylighting from an exterior of the building to the room space 1. In many actual installations, the space will include a window, skylight or other daylighting device configured to allow some amount of sunlight to enter the space. However, for its intended purpose or usage, the space requires at least some artificial lighting. Hence, the space 1 can be illuminated as/when desirable by at least one lighting device that produces artificial light during at least some times of occupancy.

The lighting device could be a table or floor lamp, etc.; although in our example, the space is illuminated by a number of light fixtures 3. Each light fixture 3 includes one or more controllable sources 4 of visible light, for illumination of the space 1. The example shows the fixtures 3 mounted in the ceiling and oriented so that the light emissions from sources 4 are directed generally downward into the space 1. Such a downlight configuration, for task lighting or other similar illumination applications, is exemplary only. The fixtures or other types of lighting devices in the example may be at any location and/or orientation relative to the space and the expected occupants 2 to support a desired general lighting application appropriate for the usage or purpose intended for the space 1. For example, the downlight fixtures 3 provide direct lighting from above. As other examples, indirect lighting may reflect light off of a ceiling or wall surface or the lighting may principally illuminate an object in the room to be viewed by the occupants 2. Each source 4 may be implemented with any suitable light generation device; although specific examples discussed below utilize LEDs alone or in combination with other sources, such as incandescent, fluorescent or organic LED (OLED) lamps and daylighting.

The sources 4 are controlled by one or more controllers. In an integrated system, for example, there may be one controller for all sources that artificially illuminate the space 1. In this first example, each light fixture 3 also includes a controller 5 coupled to the source or sources 4 in the fixture 3, to control operation thereof. The operational control causes the source(s) 4 to emit light in a manner that varies at least one characteristic of visible light emitted into the space over a period of time at least in part in accordance with a chaotic function. Some or all of the chaotic variation(s) may often not be consciously perceptible by an occupant of the space; however, sub-conscious perception of the chaotic variation(s) may still impact the occupant's perception of the environment in the space.

The lighting device, for example each of the light fixtures 3 in FIG. 1, uses power to run the controller 5 and drive the source(s) 4 to emit light. In the example, each light fixture draws electrical power from alternating current (AC) mains 6, although the light fixture 3 may be driven by a battery or other power source under normal conditions or in the event of a failure of AC mains power 6.

In the example, the light fixtures 3 are responsive to control input from a user interface device 7. The user interface device 7 can be a simple ON-OFF switch or a dimmer; or the user interface device 7 may be a more sophisticated digital control and data entry/output device. When the fixtures 3 are turned ON in response to the input from the user interface device 7, the controllers 5 generally set the output intensity to a general level and may maintain one or more color characteristics at set values. If the user interface device 7 merely provides ON-OFF settings, then the intensity and any other controlled characteristics would be maintained at around programmed nominal settings. If the interface device 7 provides dimming control for the user, then the controllers 5 would reduce the output intensity from the full ON setting to an intensity corresponding to the dimmer setting. The controllers may also set one or more color characteristics in a similar manner in response to user inputs via the device 7. However, each controller 5 in the example is also configured to vary one or more of the lighting characteristics from the nominal settings, including from any settings input via the user interface device 7, over a period of time, at least in part in accordance with a chaotic function.

Where there are a number of lighting devices that illuminate the space 1, such as light fixtures 3 in this example, the intent is for the total illumination in the space 1 to exhibit chaotic behavior in the intended manner. To that end, chaotic variations among fixtures 3 may be in-phase with each other (same timing), for example, if there is synchronism and/or common control for the fixtures 3. Alternatively, operations of one or more of the fixtures 3 may be phase delayed relative to other fixture(s) to produce similar variations but different/delayed timings; or the various fixtures 3 may be running independently and therefore producing independent chaotic components (out of phase and with different variations). Other installations may be arranged with one or more lighting devices implementing the chaotic function control whereas one or more lighting devices may not implement the chaotic function control.

The chaotic functional control or variation of the light characteristics may be implemented using a variety of control algorithms. It may be useful at this point in the discussion to consider chaotic functions in more detail, both in general terms and in terms of application thereof to control of a lighting device or system.

In science and mathematics, chaos is not a lack of order. To the contrary, chaos is an apparent lack of order in the outcomes of a complex dynamic system that actually may be deterministic. A chaotic system often is deterministic in that it follows one or more rules; however, system results are unpredictable and appear random or lacking in order because the results are not readily predictable, particularly in the long run. Hence, a chaotic system is one that operates in a dynamic manner and its dynamic operations are highly sensitive to initial conditions. The outcomes at a point in time are often determined by the parameters occurring at one or more preceding points in time, which serve as the inputs to the deterministic system in driving the current outcomes. Sensitivity to initial conditions means that small differences of initial conditions can yield significantly different results. In a system that depends on prior conditions, the prior conditions become the inputs for current or future determined outcomes; therefore such a chaotic system tends to be highly sensitive to the conditions leading up to current time. The sensitivity to initial conditions, say the current and prior conditions that serve as 'initial conditions' for prediction of future outputs, makes prediction of long-term outcomes difficult or impossible.

Chaotic behavior occurs in many natural systems. Weather, for example, is a naturally occurring chaotic system. It is relatively easy to observe present conditions and track past conditions, for use in predicting the weather. However, even with sophisticated computer modeling and increasingly comprehensive data accumulation, weather is not readily predictable beyond a few days or a week. Examples of the chaotically varying characteristics of the weather include conditions like air temperature, air pressure, humidity, precipitation, visibility, wind speed, and wind direction (in two or three dimensions).

In an outdoor environment, parameters of natural lighting produced by sunlight, shading and/or reflection of light in the environment and light transmission through the atmosphere also form a naturally occurring chaotic system. Examples of the chaotically varying characteristics of naturally occurring lighting include intensity of light flux, color temperature of the light and chromaticity difference or Delta_uv (distance of color characteristic point off of the Planckian locus, in uv color space).

The human nervous system also is a chaotic system. However, aspects of human perception are, after eons of evolution in Earth's natural environment, accustomed and even somewhat attuned to natural variation of characteristics of the environmental conditions, including chaotically varying characteristics such as those of the weather and of natural lighting. As a result, humans are actually sensitive to variations, including chaotic variations at levels and rates that may not be readily or consciously perceptible. However, sensing of such variations does impact the human nervous system in ways that may affect human mood and/or performance. Compared to natural conditions, controlled characteristics of indoor conditions have tended in the past to be relatively static over substantial periods of time each day.

The systems and procedures discussed below by way of examples incorporate chaotic variations into control functions of a lighting device or system in a manner intended to support or facilitate an objective purpose of a space that the device or system illuminates. Depending on the purpose(s) of the space, the environment in a controlled space can calm, the environment can excite, the environment can affect productivity favorably or unfavorably, and/or the environment can make occupants feel good, bad or indifferent. For many applications, promotion of the purpose of the space will involve a lighting effect that may be considered positive or pleasant in some manner. However, for some purposes and/or at some times, a negative or unpleasant impact may be appropriate, e.g. to encourage unwanted visitors (human or animal or insect, etc.) to leave a space or even to impair an intruder's perception while intruding into a secure space.

The chaotic variation of a light characteristic introduced by the technologies discussed herein may be similar to that found in nature; however, the lighting control need not particularly mimic natural day lighting. In many settings, the variation need not track that occurring in nature. Rather than implementing natural day lighting conditions in the illuminated space, for at least those purposes where aspects of daylight support the intended purpose, the controlled lighting system or device adds analogous components via chaotic function control, to liven up or put life (dynamic change) in one or more of the characteristics of the lighting condition in the space illuminated by the device or system.

Some examples of chaotic functions may be defined by three or more linked differential equations, often where each equation has one or more non-linear terms and the coefficients of the terms configure the system of equations for operation near or at a transition point from orderly to disorderly behavior. However, other formulae may be used. A somewhat simpler chaotic function maybe expressed by an equation like the following:

$$x_{n+1} = rx_n(1-x_n) \quad (1)$$

(Source: Wikipedia, "Chaos Theory," http://en.wikipedia.org/wiki/Chaos_theory)

Figure 2:
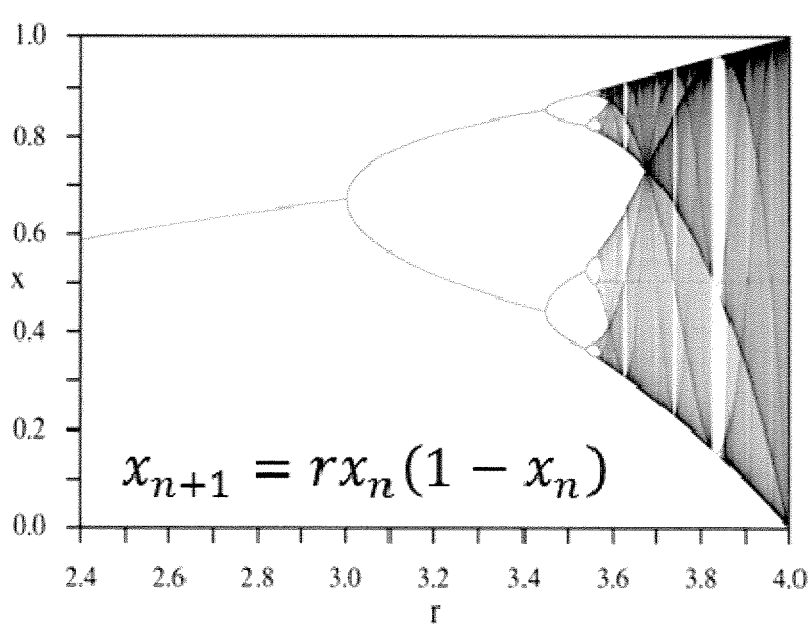
FIG. 2 is a graph showing a relationship of states of a variable to a range of coefficient values for an equation that may define a chaotic control function, for a simple example.

In equation 1 above, the variable x for the next time point n+1 is dependent on the value of x of the current time point n. The initial condition for $x_{n+1}$ is $x_n$. FIG. 2 is a graph (from the source Wikipedia article noted above) showing possible outcomes of x for different values of the coefficient r. The example uses a damping type of equation that creates a chaotic function.

Figure 3A:
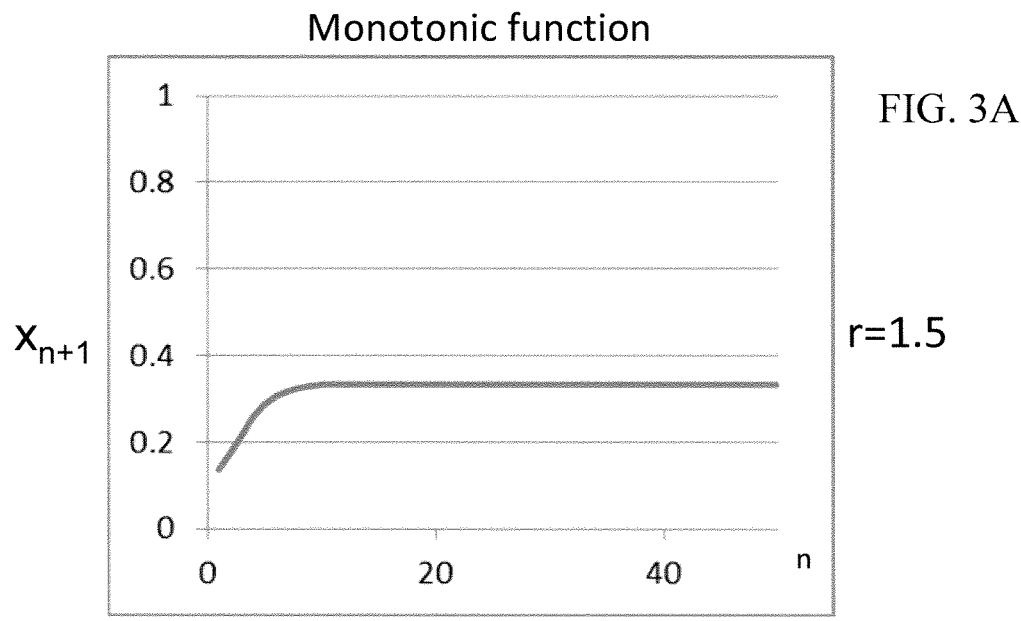
FIGS. 3A to 3E show the resulting functions, achieved using different values for the coefficient, for the equation represented in FIG. 2.

For values of r below approximately 3.0, x is a relatively monotonic function. FIG. 3A shows the function $x_{n+1}$, for a range to values n, in a case in which the coefficient r is 1.5. As shown, the function quickly reaches a value of approximately 2.7 and stays at that value. The outcome of the function is monotonic at that value for values of n above approximately 9 or 10. In this state produced by the low value of r, variation as a function of n is minimal and damps out quickly.

Figure 3B:
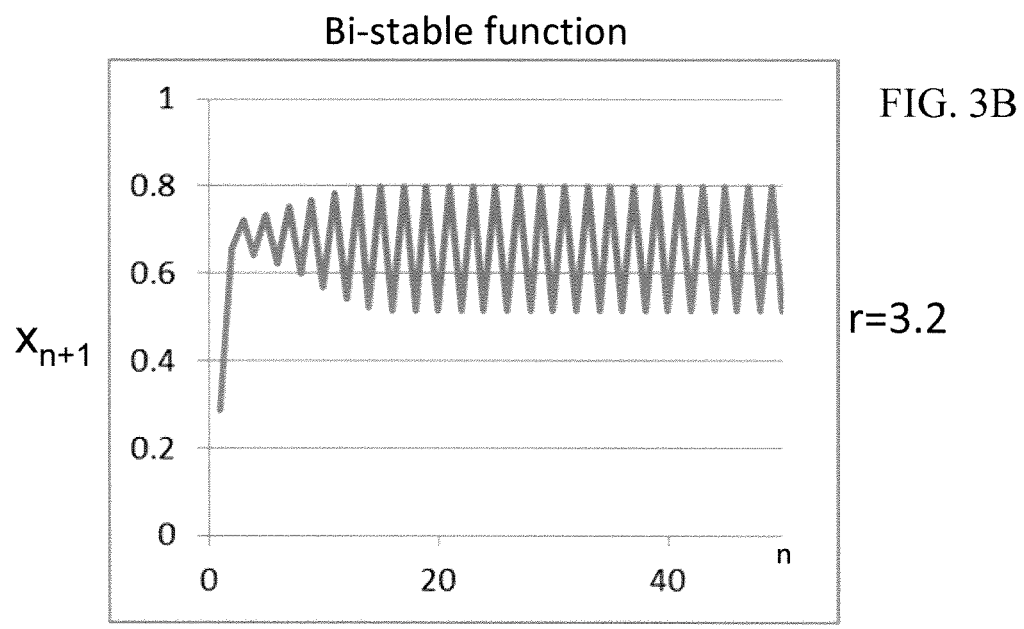

Returning to FIG. 2, in the range of r from approximately 3.0 to 3.4 for the value of the coefficient of r, there are essentially two possible outcomes for x. In this coefficient range, the function of x tends to be bi-stable. By way of an illustrative example of a bi-stable state of the function of equation (1), FIG. 3B depicts the function $x_{n+1}$, for a range to values n, in a case in which the coefficient r is 3.2.

Figure 3C:
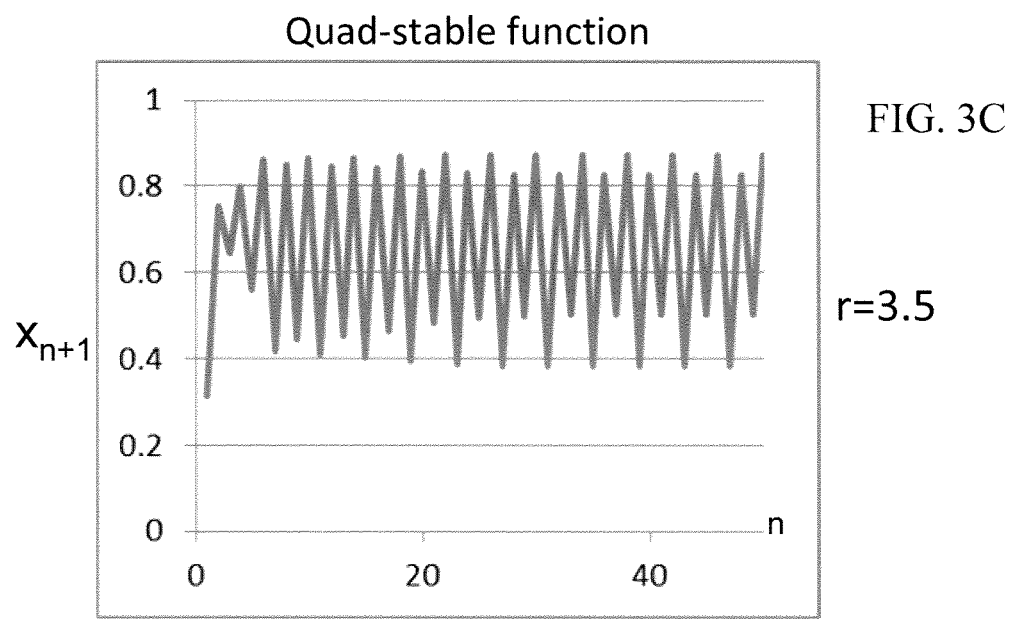

Returning to FIG. 2, in the range of r from approximately 3.4 to 3.6 for the value of the coefficient of r, there are essentially four possible outcomes for x. In this coefficient range, the function of x tends to be quad-stable, i.e. a function that exhibits essentially four regularly repeating outcomes. By way of an illustrative example of a quad-stable state of the function of equation (1), FIG. 3C depicts the function $x_{n+1}$, for a range to values n, in a case in which the coefficient r is 3.5.

Figure 3D:
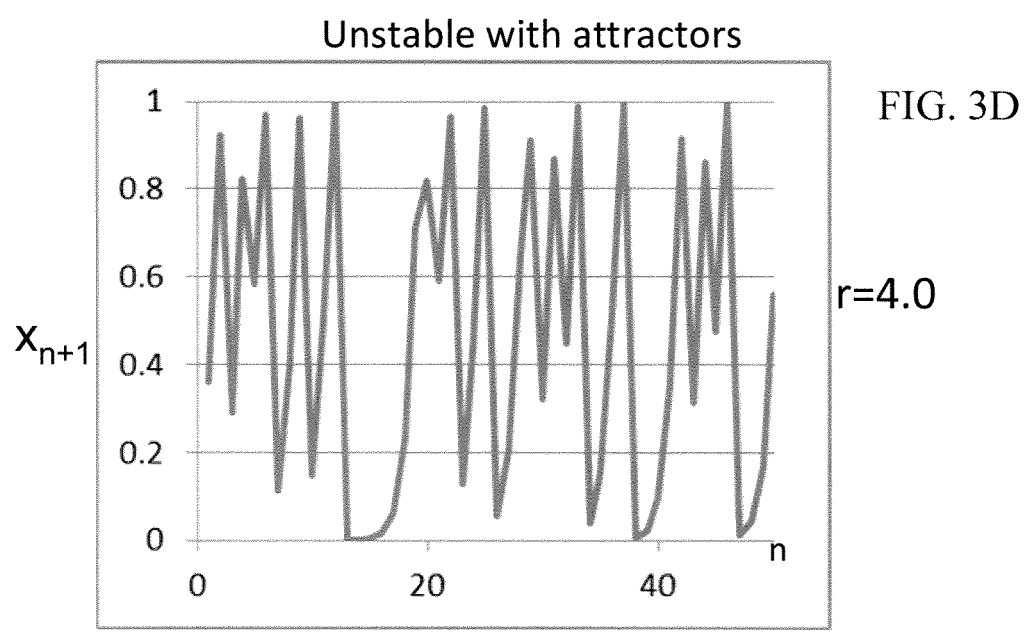
Figure 3E:
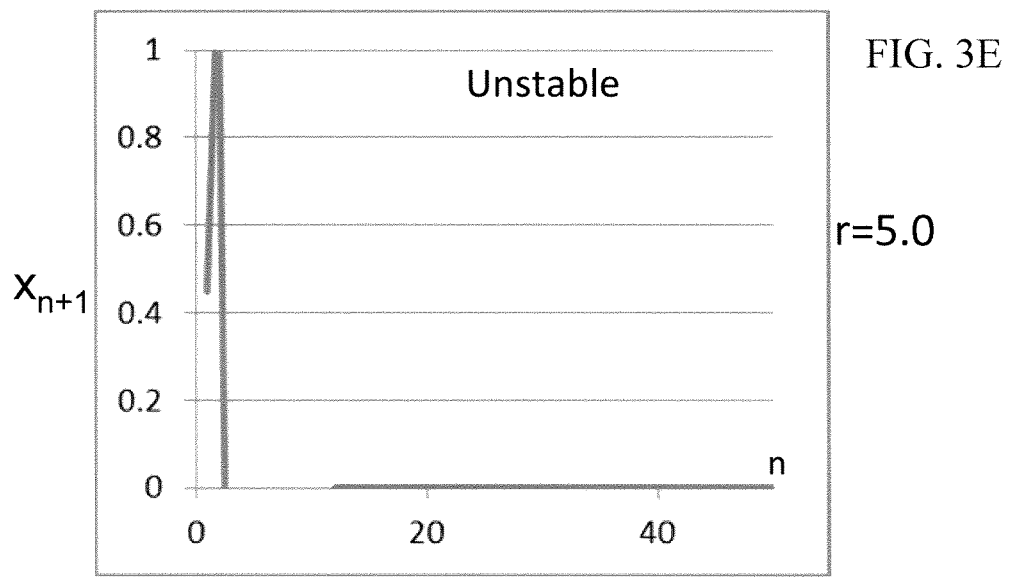

As shown in FIG. 2 the number and variances of the function x for values of the coefficient r increase significantly for higher values of r, say above 3.6 or 3.7. In the early part of this range, the function x is somewhat unstable but tends to be attracted to return in somewhat irregular manner to or near a number of recurring values, referred to as attractors. FIG. 3D illustrates an example of the function of equation (1) in which a coefficient value for r is 4.0, which produces outcomes for $x_{n+1}$ that vary in a somewhat unstable manner but with attractors. For a higher coefficient value, say 5.0 by way of an example, the function becomes completely unstable as shown by way of example in FIG. 3E.

For the lighting control theory under consideration here, devices or systems will most likely operate with a chaotic function configured in a state of a type that provides unstable with attractor type variations analogous to the example of FIG. 3D. However, for some purposes, quad-stable or bystable may be used. Fully unstable would probably not be used. Hence, for purposes discussions of further examples of lighting control, we will assume use of a chaotic function in an unstable state with attractors. If the function (1) is used as the chaotic function, the coefficient r might be set to a value that produces outcomes like that of FIG. 3D. Attractors are results that the function tends to go back to from time to time, although not in an actual repeating pattern. In the 4.0 example of FIG. 3D, $x_{n+1}$ tends to go back to or close to the same minimum and maximum values in an irregular manner over time n (quasi-pattern); although the minima and maxima are not exactly the same, the curvatures to and from maxima and minima vary, and there is not any real exact periodicity.

The human brain also may be thought of as a chaotic system. The human brain tends to vary between states that are neither monostable nor unstable chaotic. Instead, the brain tends to vary in a state range from bi-stable, through quad-stable up to states that may be somewhat unstable with attractors.

Figure 4A:
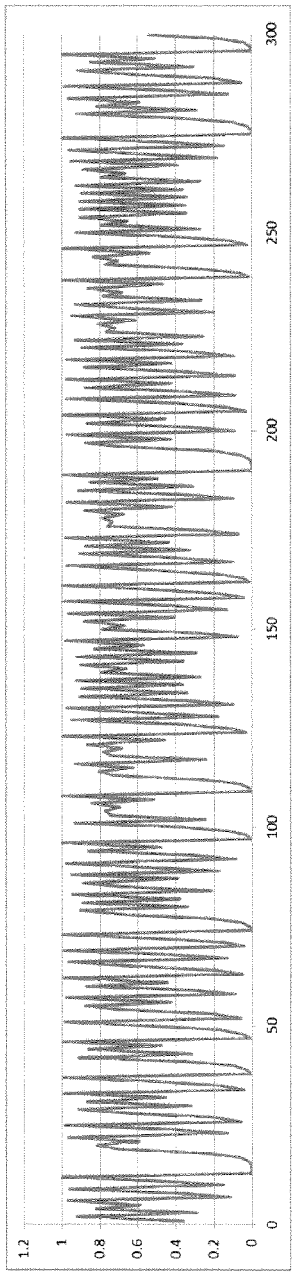
FIGS. 4A to 4C, respectively show a chaotic function in an unstable-with-attractors state, a portion of a sine wave and an example of a combination of the chaotic function and the sine wave portion.
Figure 4B:
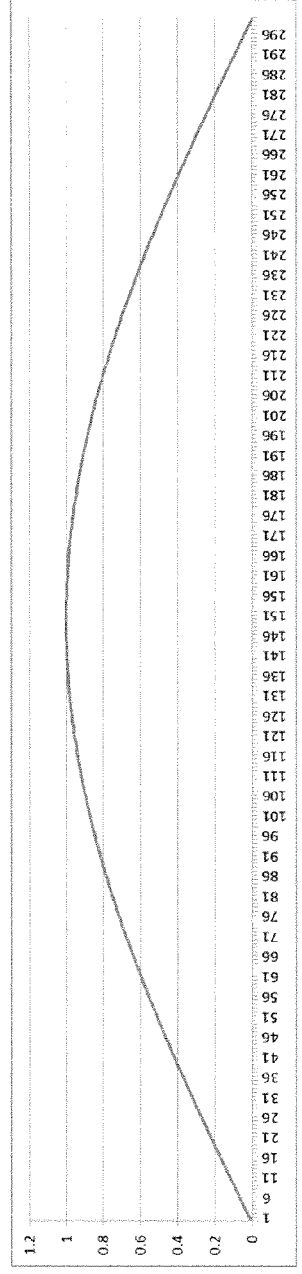
Figure 4C:
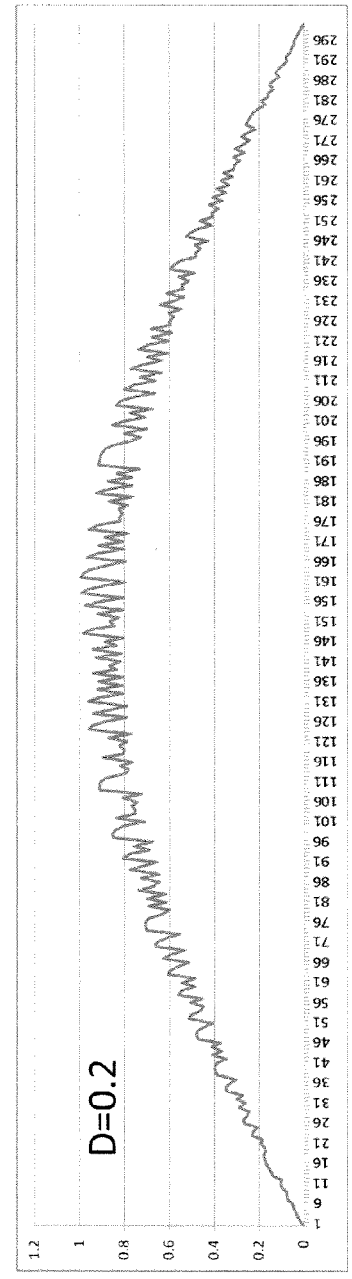

FIGS. 4A to 4C are function graphs useful in explaining a chaotic equation combined with a sine equation. FIG. 4A shows a chaotic function in an unstable-with-attractors state the same as or similar to that of FIG. 3D, over 300 units of time. The units of time may be seconds, minutes, hours, or factions or multiples of any such units, depending on the particular lighting characteristic controlled and the purpose or objective that is supported by the lighting control function. For example, different time scales may be applied for controlling intensity, color temperature, Delta_uv, etc., in the same or different lighting device or system. The parameter of the function shown on the vertical axis represents magnitude of the function normalized to a range from 0 to 1.

The controller 5 may be configured to apply the chaotic function directly to control the relevant source output characteristic. However, in many implementations, the controller 5 may be configured to control operation of the source(s) 4 of visible light so that the at least one characteristic of the visible light emitted from the source(s) 4 into the space 1 varies in accordance with a combination of a nominal function over the period of time and the chaotic function. The nominal function may be a fixed value or a variable value. In other examples, the nominal function is a variable function added to or otherwise superimposed on a set value.

FIG. 4B shows a portion, in this case a half-wave or 180°, of a sine wave function. The time scale for the sine wave is the same as that used for the chaotic function in FIG. 4A; and again, the magnitude is normalized to a range from 0 to 1. FIG. 4C shows a combination of the chaotic function with the sine wave. The chaotic function may be combined with the sine wave in a variety of ways. In the example, the outcome of the sine equation is multiplied by one minus the outcome of the chaotic equation times a dampening parameter D. The dampening parameter D limits the variation caused by the chaotic function. In the specific example D=0.2.

Figure 5A:
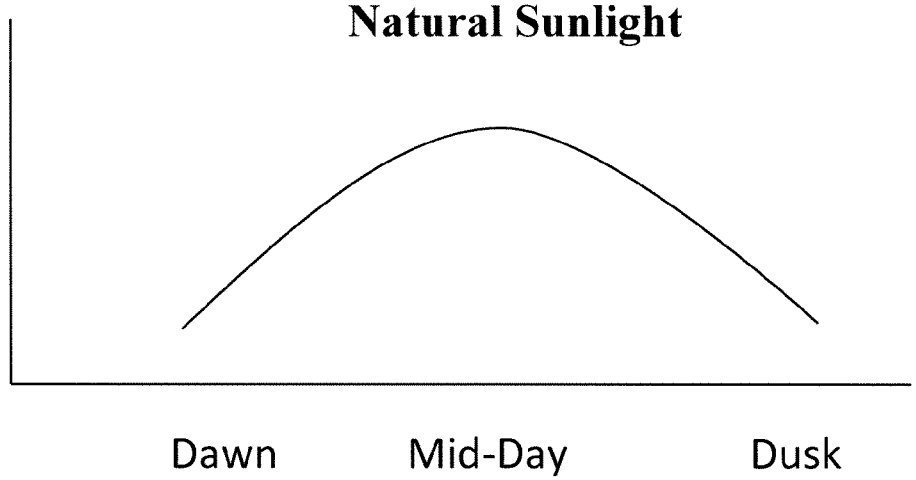
FIG. 5A illustrates a rough approximation of a general trend or nominal curve for natural sunlight, from dawn to dusk.
Figure 5B:
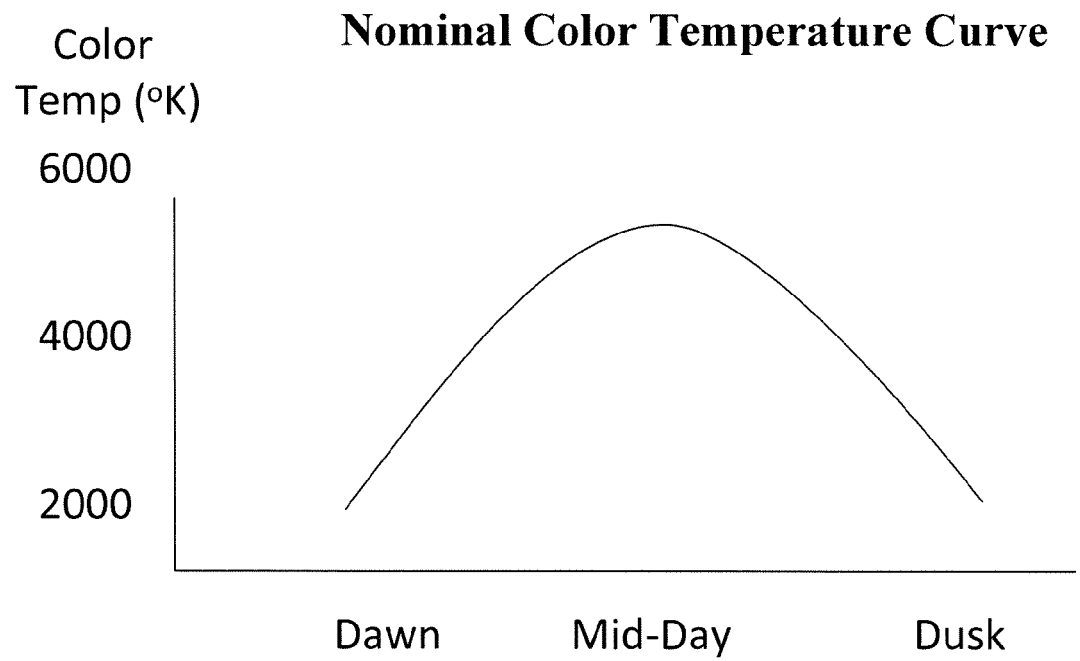
FIG. 5B shows an example of an approximate nominal curve for color temperature for natural sunlight, over the hours of daylight.

The sine function is used here as just an easy example of a variable nominal function or variable component that may be used in combination with a minimum or established setting value to form a nominal function. However, many functions in nature tend to vary in a manner that can be somewhat approximated by a sine wave. FIG. 5A, for example, depicts a rough approximation of the general trend (without specific values) over the daylight hours for a nominal or normalized intensity curve for natural sunlight. FIG. 5B shows an example of a nominal curve for color temperature in degrees Kelvin (K) over the hours of daylight. Color Temperature at night is ~10,000° K. During periods of overcast or in shady areas, color temps are ~7,500° K.

However, rather than using an approximation of the natural trend from zero to maximum and back to zero, for artificial light, some amount of artificial light will normally be provided at all times when the device or system is ON to provide light. Hence, rather than use the curve of FIG. 4A or FIG. 4C as the lighting control function, the lighting device or system will typically add the function to or otherwise superimpose the function on the current setting value for the relevant light parameter.

Using the function of FIG. 4C as the example, the function could be added onto the otherwise normal full ON intensity value or to a somewhat lower intensity value selected by the user via a dimmer type input provided by user interface device 7. In this manner, the intensity of the output light would vary above or about the set intensity value in accordance with the function illustrated in FIG. 4C. As a result, over the assigned period, the actual light intensity would be the selected intensity plus a variable amount determined by the function of FIG. 4C.

Of course, instead of or in addition to such control of intensity, a controller 5 may control one or more other characteristics of the visible light output from the source(s) 4, such as spectral content of light, polarization of light, color temperature of light, and chromaticity difference (Delta_uv) of light from the Planckian locus, in a similar manner. Using color temperature as another example, the function of FIG. 4A reduced by application of a coefficient, say corresponding to 10%, could be multiplied by a color temperature setting to combine the chaotic function with the nominal value function. Alternatively, to achieve a general trend more like that shown in FIG. 5B, the combined function of FIG. 4B reduced by application of a coefficient, say corresponding to 10%, could be multiplied by a color temperature setting to combine the chaotic function with the nominal value function.

Other techniques may be used to combine a selected function, that includes a chaotic function component, e.g. like the functions shown in FIGS. 4A and 4C, with a setting or other type of target value for the particular lighting condition to which the chaotic function control is applied.

Figure 6A:
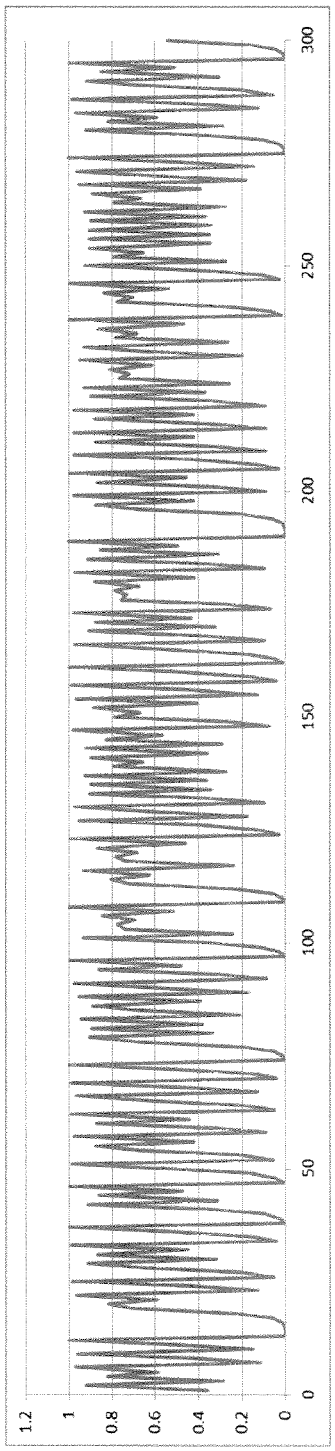
FIGS. 6A to 6C, respectively show the chaotic function in the unstable-with-attractors state, another chaotic function in a similar state but using a different timing rate and an example of a combination of the two chaotic functions.
Figure 6B:
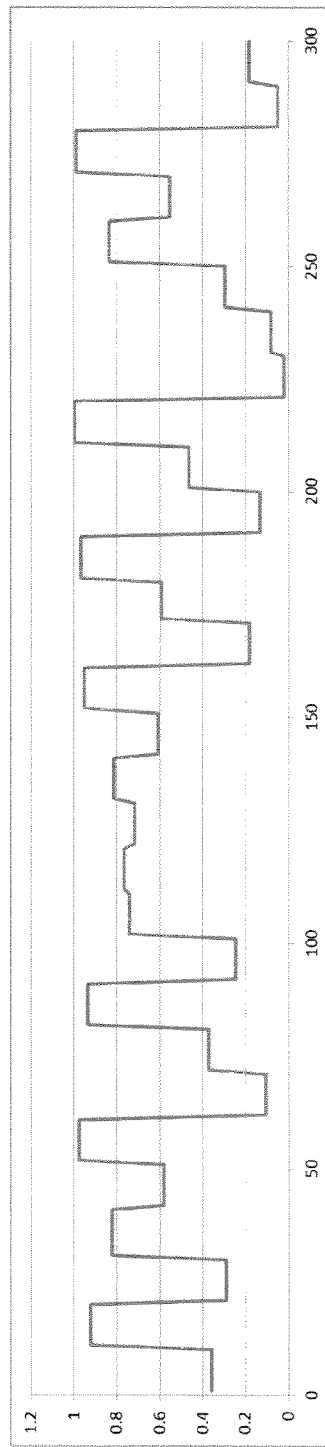

Of course, chaotic function control components can be applied to control lighting conditions in a variety of other ways. As another example, consider next FIGS. 6A to 6C and 7. FIG. 6A is another illustration of the chaotic function in the unstable-with-attractors state, similar to that shown in FIG. 4A. FIG. 6B shows another chaotic function in a similar state but using a different timing rate. The drawings show the two chaotic functions over the same period, 0 to 300 time units. However, the function shown in FIG. 6A varies at a higher rate than the lower rate variation of the function shown in FIG. 6B. Although the functions could vary in other ways too, in this example, both are implemented with or defined by the same equation, such as equation (1) above. To achieve the different rate functions, the functions use a different timing cycle or rate for n. For example, the function in FIG. 6A might be controlled using n in values of seconds; whereas the FIG. B implementation of the function might be expressed using n in terms of minutes or hours. Another approach to obtaining two somewhat different chaotic functions, even if using essentially the same formula or equation is to vary the coefficient r. Of course, another exemplary approach would be to use different equations.

Figure 6C:
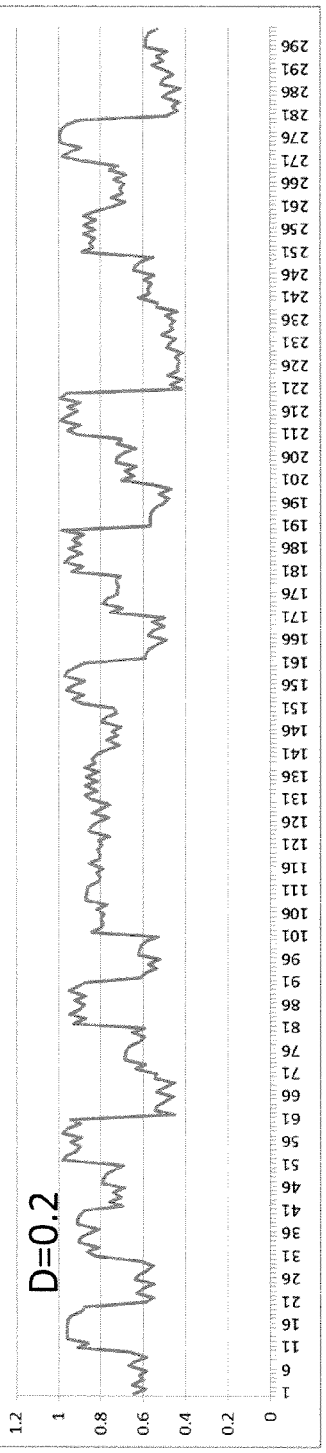

FIG. 6C shows a combination of the two chaotic functions. The chaotic functions may be combined in a variety of ways. In the example, assume that the low frequency chaotic function of FIG. 6B is Cf(Lo) and the high frequency chaotic function of FIG. 6A is Cf(Hi). With that nomenclature, the combined function C of FIG. 6C can be expressed as C=Cf(Lo)×(1−Cf(Hi)×D), where D is a damping coefficient. In the specific illustrated example, D in FIG. 6C is 0.2.

A function like that of FIG. 6C can in turn be used to control a characteristic of visible light emitted from any of the light sources 4 into the space 1. For example, the function of FIG. 6C could be added onto, adjusted with a coefficient and multiplied by or otherwise superimposed on the regular setting value for the controlled condition. If so combined with the normal full ON intensity value or to a somewhat lower value selected by the user via a dimmer type input provided by user interface device 7, the controlled intensity characteristic would vary above or about the set intensity value in accordance with the function of FIG. 6C. As a result, over the assigned period, the actual light intensity would be the selected intensity combined with a variable amount determined by the function of FIG. 4C. Of course, instead of or in addition to such control of intensity, a controller 5 may control one or more other characteristics of the visible light output from the source(s) 4 such as spectral content of light, polarization of light, color temperature of light, and chromaticity difference (Delta_uv) of light from the Planckian locus, in a similar manner based on a combination of a setting and a function like that of FIG. 6C.

Figure 7:
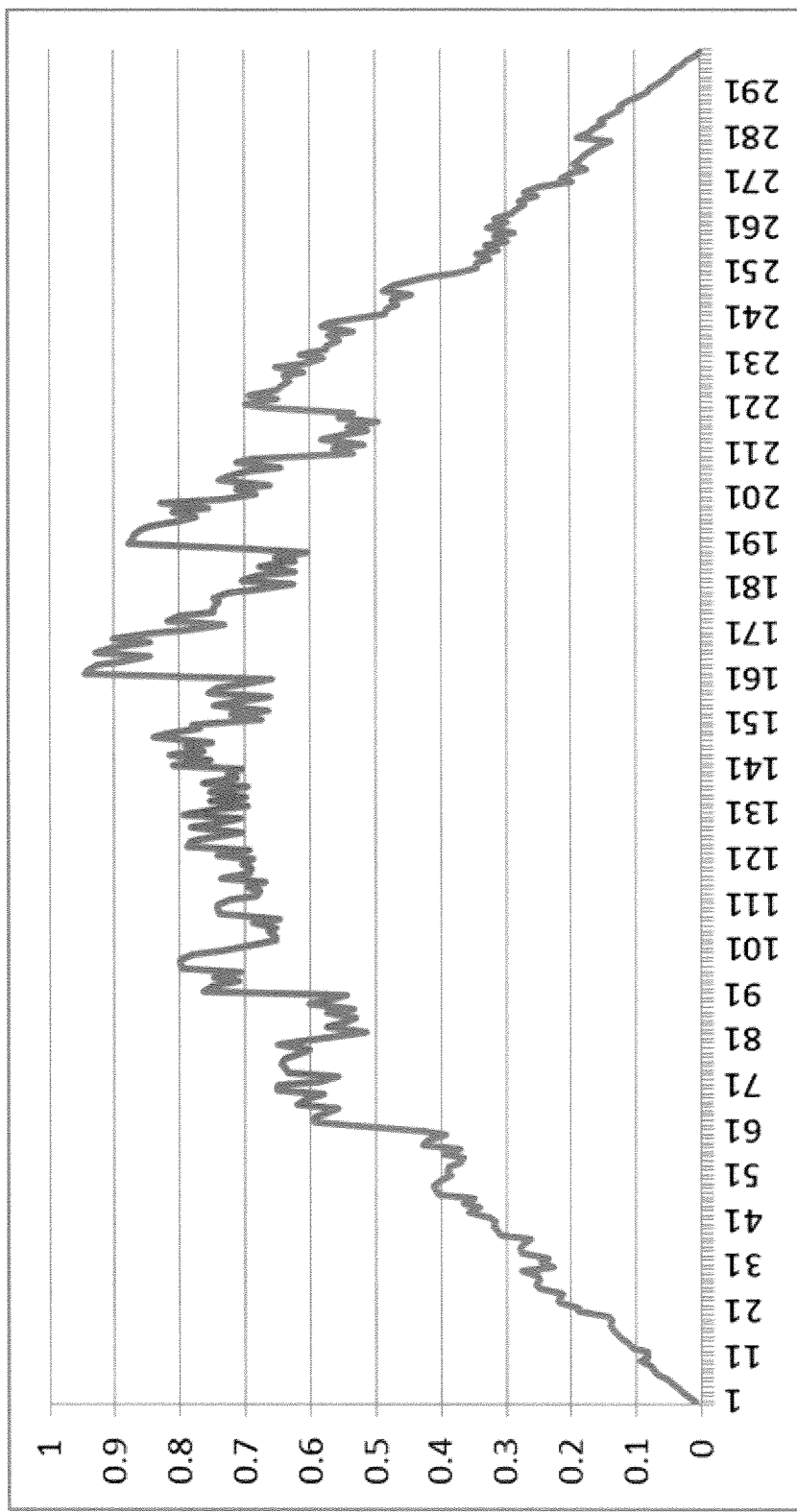
FIG. 7 depicts an example of the two-chaotic example of FIG. 6C combined together with a portion of a sine wave.

As an alternative approach, the two chaotic functions can be combined with a sine wave, to produce a function like that shown in FIG. 7. Again, the sine function is used here as just an easy example of a nominal function that may roughly approximate general trends of variations of naturally occurring lighting characteristics. The combination technique could combine the function of the FIG. 6C with a sine wave like that of FIG. 4B in a manner similar that that used with respect to the function of FIG. 4C. In the actual example of FIG. 7 however, each chaotic function from FIGS. 6A and 6B is separately combined with the sine wave and then the two results are averaged to produce the overall/combined function of FIG. 7.

Again using the nomenclature used in the discussion of FIG. 6C, the low frequency chaotic function Cf(Lo) of FIG. 6B is combined with the sine by multiplying the outcome of the sine equation by one minus Cf(Lo) times a dampening parameter D, to obtain a value v1. Similarly, the high frequency chaotic function Cf(Hi) of FIG. 6A is combined with the sine by multiplying the outcome of the sine equation by one minus Cf(Hi) times a dampening parameter D, to obtain a value v2. The damping parameters could be different; but for simplicity here, the damping parameters are the same value D, such as 0.2. The function of FIG. 7 is then obtained by averaging the two intermediate combinational functions, i.e. using (v1+v2)/2.

The function of FIG. 7 can be used to directly control one or more of the lighting characteristics, or the function of FIG. 7 can be combined with a setting for the characteristic(s) as in the earlier examples. Again, such a control function can be applied to light intensity and/or to one or more other characteristics of light, such as spectral content of light, polarization of light, color temperature of light, and chromaticity difference (Delta_uv) of light from the Planckian locus.

For artificial lighting applications, chaotic functional control will not exactly track natural lighting conditions. In some cases, the resulting variations may be quite different from those that occur in the natural lighting. However, to promote some purposes of the illuminated space 1, the variation captures or adds a degree of liveliness similar or analogous to variations in natural lighting. With such arrangements of the control algorithm implemented by controller 5, the chaotic function and/or the combination of a nominal function and the chaotic function for one or more of the controlled characteristics would approximate a natural variation of the relevant characteristic(s) of visible light. Hence, it may be useful to consider some examples of actual measured lighting conditions.

Figure 8A:
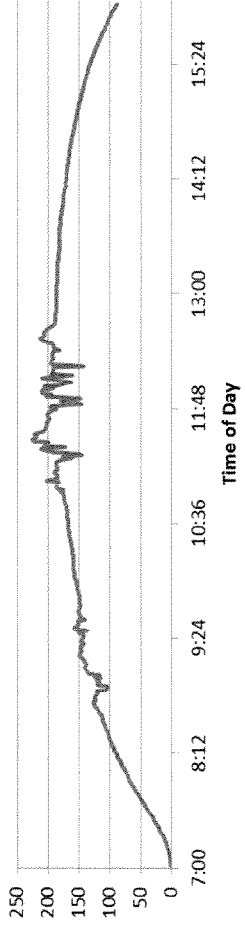
FIGS. 8A to 8C are graphs of light condition measurements, specifically flux, color temperature and chromaticity difference (Delta_uv), for a sunny day.
Figure 8B:
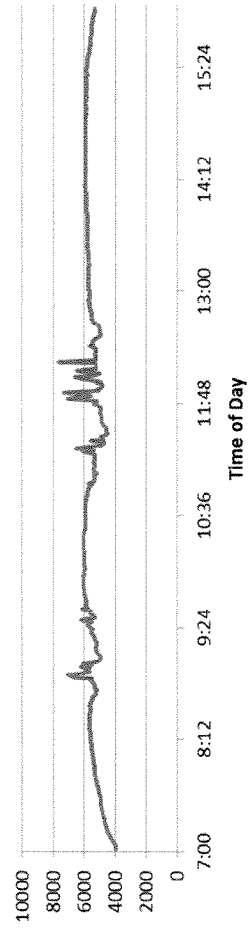
Figure 8C:
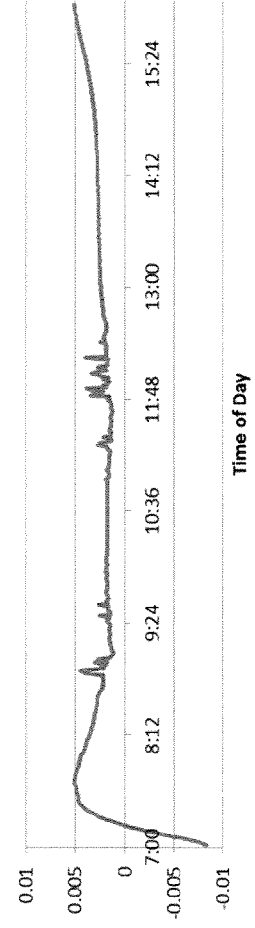
Figure 9A:
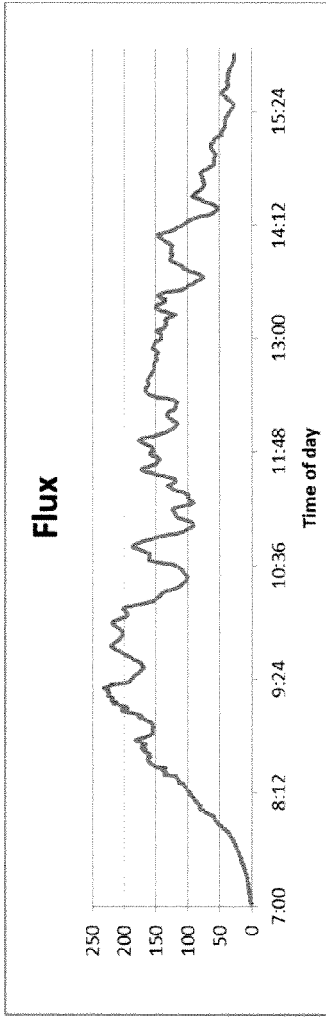
FIGS. 9A to 9C are graphs of light condition measurements, specifically flux, color temperature and chromaticity difference (Delta_uv), for a cloudy day.
Figure 9B:
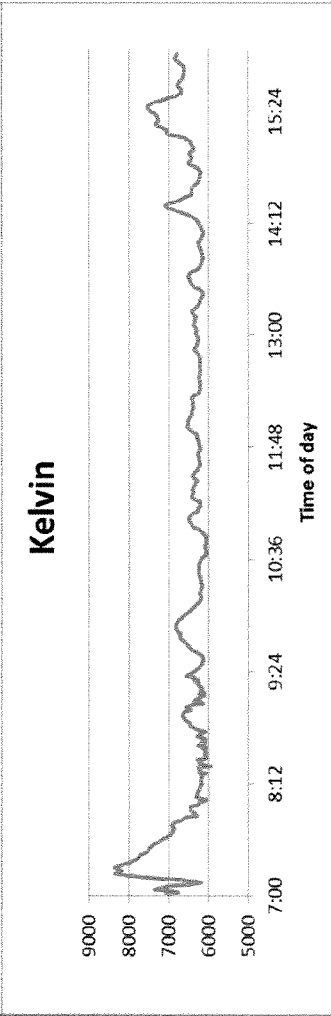
Figure 9C:
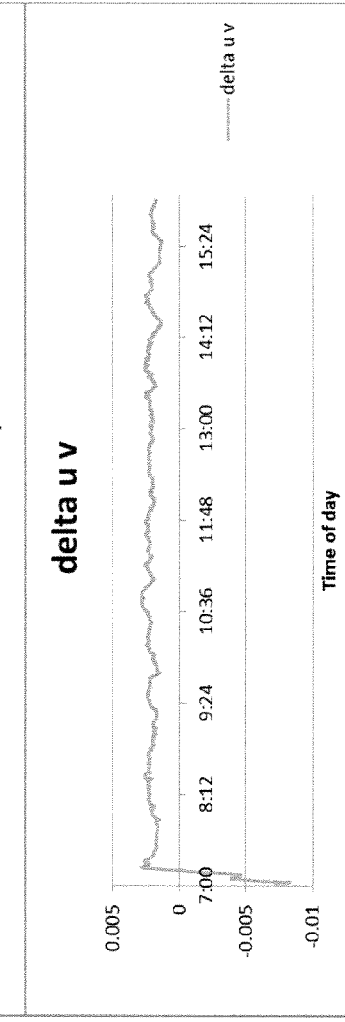

FIGS. 8A to 8C respectively show measured intensity (light flux, for example, measured in foot-candles or fcd) color temperature (in degrees Kelvin (K)) and chromaticity difference (Delta_uv) for a sunny day. FIGS. 9A to 9C show similar measurements taken a somewhat cloudy day.

The readings used to form the graphs in these three sets of drawings were measured using a Minolta luminance meter arranged to collect outside light through a window (aimed not to collect indoor artificial light). However, the window did have some filter effect, e.g. tinting and UV protection. Also, some light reflected in from outside objects. Hence, the measurements represent light entering a room through the window. Photopic flux—represents amount of light—as shown in FIGS. 8A and 9A and is a measure of light intensity. Color temperature (K) and chromaticity difference (Delta_uv) are two commonly used color characteristics of light. The illustrated measurements are intended to show relative readings that vary over time, rather than actual values.

FIGS. 8A to 8C show that flux, color temperature and Delta_uv have highest rates of change at about the same time. The different characteristics of light may be fairly monotonic over one or more substantial periods during the sunny day, but then each exhibits a period of more chaotic changes. Periods of chaotic change roughly correspond. In a control system, the equations for the three factors may be coordinated in time. If the control is intended to achieve a result similar to one or more of these measurement graphs, the control could vary the coefficient r for different times of day, between a value that produces monotonic results and a value that produces an unstable result with attractors. This approach tends to liven up or put life (dynamic change) into the controlled conditions in the space in a manner that an occupant might perceive as similar to a pleasant sunny day outdoors.

An emulation of a cloudy day may not feel as exciting as the emulation of the sunny day, but such a control approach could be useful in some settings or for some purposes. Hence, chaotic control functions could be used to achieve lighting variations in one or more characteristics of light somewhat similar to those shown by way of examples in FIGS. 9A to 9C.

It should be noted, however, that the concepts described here are not particularly intended to copy or mimic exact characteristics of lighting on any particular day, e.g. the sunny day. The strategies here could be used to copy specific daylight characteristics, but typically would not. Instead, the intent of discussing the actual day light measurements is to learn and teach about relevant chaos theory based on the natural day conditions, and then develop our techniques to add analogous components via chaotic function control to dynamic change into the controlled lighting conditions in the illuminated space. Where the lighting device or system will varying more than one characteristic of the light, the components added to vary one characteristic may be different and/or relate to parameters of a different type of day. For example, the light flux or intensity might vary in accordance with the function shown in FIG. 6C, whereas one or both of the color characteristics might look more like those from one of the days discussed above relative to FIG. 8B, 8C, 9B or 9C.

In some instances outlined above, the controlled value of a light characteristic would be defined by a setting value plus a variable function that is or includes a chaotic function, such as one of functions discussed above relative to drawings such as FIGS. 4A, 4C, 6A to 6C and 7. However, some or all of the variations may be limited, for example, to insure that the variations do not deviate from setting values in a manner that might reduce serviceability of the lighting in the space 1. For example, it may be undesirable for the intensity to fall below a minimum specified by a government regulatory agency or for a color characteristic to vary in a manner that might be disturbing or distracting. Hence, the controller may be configured to limit extent of the variation in accordance with the chaotic function to less than or equal to a predetermined maximum amount and/or to limit rate of the variation in accordance with the chaotic function to less than or equal to a predetermined maximum rate.

The chaotic control of light may be implemented in one or more lighting devices 4. In the example of FIG. 1 one or each light fixture 3 is a single independent light fixture including its own source(s) 4 of visible light and its own controller 5. Each such controller in turn is configured to implement chaotic control in a manner as outlined above. Devices like fixtures 3 illuminating the same space may control the same characteristic(s) of light in the same way(s), or such devices may control different characteristics of light in a relatively independent manner. However, where some coordination of variation is desirable, e.g. to have two or more characteristics have variations that are somewhat coordinated (like those shown in FIGS. 8A to 8C or 9A to 9C), the chaotic control functions of devices illuminating one space may be synchronized or otherwise coordinated to achieve the desired results.

The present control concepts also may be implemented in lighting system type configurations. Such a system would include a number of light fixtures or other types of lighting devices. In a system of fixtures, each light fixture includes one or more sources of visible light and one or more controllers. The controllers in the light fixtures are configured to control operations of the sources in the fixtures in a coordinated manner to vary at least one characteristic of total visible light emitted by the sources into the space over the period of time at least in part in accordance with the chaotic function. To appreciate this later type of implementation, it may be helpful to consider the simplified network example shown in FIG. 10. The illuminated space (or spaces) and the occupants are omitted from FIG. 10, for convenience.

Figure 10:
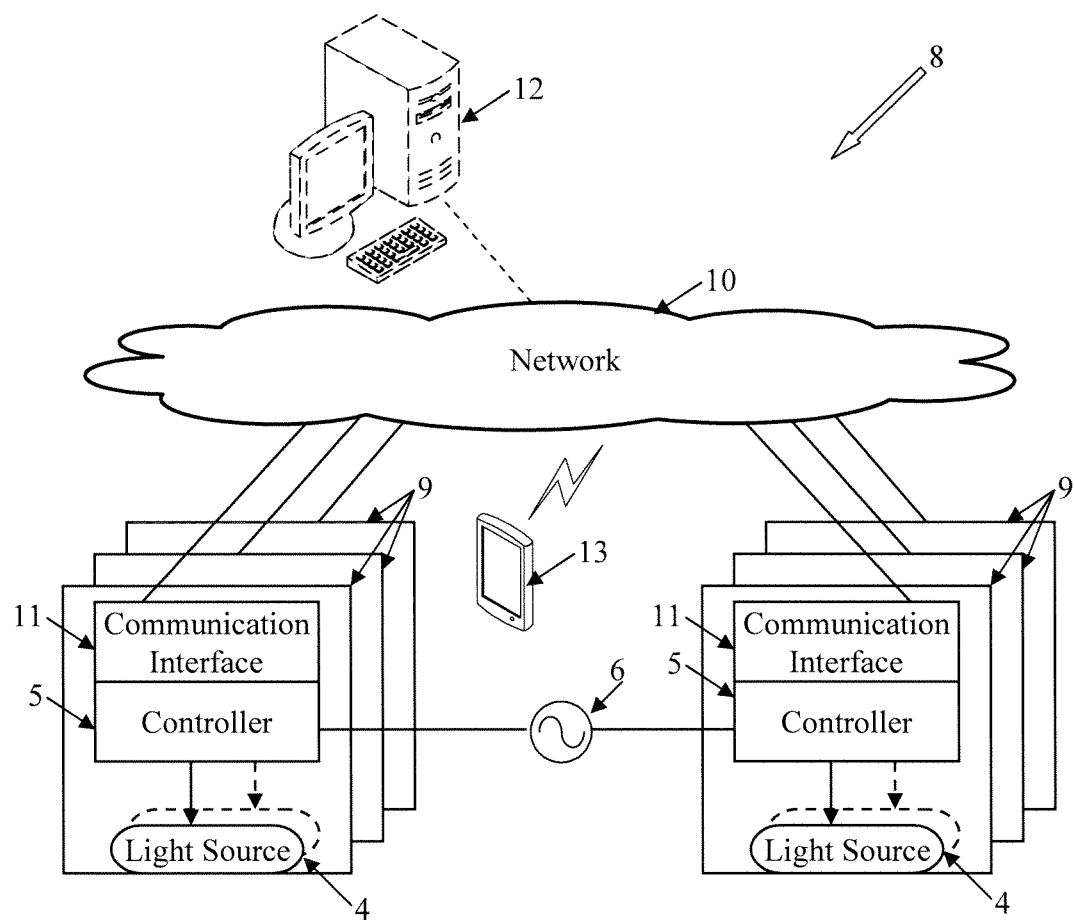
FIG. 10 is a functional block diagram of a system of light fixtures utilizing network communication.

Hence, FIG. 10 shows a system 8 of light fixtures 9 coupled for communication via a network 10. The fixtures 9 are similar to the fixtures 3 in that each of the fixtures 9 includes one or more light sources 4 and a controller 5 and draws power from a similar power source, represented again by connections to the AC mains 6. However, to enable communications via the network 10, each of the fixtures 9 also includes a communication interface 11. The communication interface 11 may be of any type suitable to provide the desired communication capabilities at the respective premises, e.g. bandwidth or data rate, for communication via the particular implementation of the network 10. The network 10 may be partially or entirely private, e.g. a local area network (LAN) or intranet; or the network 10 may be a wide area network such as the public Internet. The network 10 may utilize any appropriate wired, fiber or wireless technology or combination of two or more such technologies to provide communications capabilities for lighting and possibly for other data communications at the premises of the system installation and/or to devices or networks outside the premises. Based on the configuration of the network 10, the communication interface 11 may be an optical or electrical wired communication device, or the communication interface 11 may be an optical or radio frequency type wireless communication device. Data communication for the fixtures 9 could be one-way downstream toward the fixtures 9; however, in most cases, the network 10 and the communication interfaces 11 will support two-way data communications.

In such a network environment, control and coordination amongst the networked fixtures 9 may be implemented in a variety of ways. For example, the network may merely carry signals to enable the controllers 5 to synchronize their otherwise relatively independent chaotic control functions. However, in most networked implementations there will actually be a higher level control function, although that higher layer functionality can be implemented in several different ways/places in the system 8. For example, one of the controllers 5 may be designated as a 'master' controller with respect to the other 'slave' controllers 5. It may also be possible to implement the higher layer system control functionality on a distributed basis, in which some portion of processing resources of each of the controllers 5 is allocated to the higher layer system control functionality while other resources of the controllers perform their respective individual control functions in accordance with instructions derived collectively by the distributed higher layer control resources.

Another approach involves use of a separate additional control unit, shown in dotted line form at 12 in the drawing. Although the higher layer control functions of the system 8 may include a number of higher levels of control system computers, the simple example of FIG. 10 of the system 8 includes a computer that serves as a central or building control system. With regard to the controllers 5 in the light fixtures 9, the computer 12 may be programmed to operate as a server, although it may also include user interface elements such as a display and keyboard. In such an implementation, relative to the central control 'server,' the controllers 5 would be programmed or otherwise configured as client devices.

The central control computer 12 would receive data from the controllers 5 of the light fixtures 9 via the network 10. The data, for example, may represent operational states of the fixtures and/or include information about sensed conditions (if sensors are provided in the fixtures). The central control computer 12 would process the received data and, in accordance with its own programming, provide instructions and any necessary data to the controllers 5 of the light fixtures 9 via the network 10 to cause the system 8 as a whole to operate in a desired manner. Of particular note, the operations controlled in this manner would include various chaotic control functions of the type discussed above.

As noted, the computer 12 may include user interface elements. These elements for example allow responsible personnel to review data about system operations and to change operational parameters. The computer 12 may also download programming to the controllers 5 via the network 10. For high level control purposes, the exemplary system 8 also may include one or more user terminal or client computers, for personnel of the entity operating the lighting devices 9, represented generally by the tablet computer 13 shown in the drawing. Any type of terminal, capable of communicating via the particular network 10 may be used. The terminal would allow personnel at other locations to access the central control computer 12, to perform data review and control input functions similar to those available via the keyboard and display of the computer 12.

The networked fixtures 9 could all illuminate one space; or in a networked system 8, various groups of fixtures 9 could illuminate different spaces within or about a controlled building, campus or the like.

Although not shown, the system 8 also may include individual user interface elements coupled to the controllers 5 or to the network 10 for local user inputs similar to those provided by the interface 6 in the earlier example. For example, in a multi-room venue, there might be an ON-OFF switch and/or dimmer in each room to set the general intensity level. However, the controllers 5 of the fixtures 9 in each room would respond to the central control computer 12 and would implement chaotic control functions with respect to one or more characteristics of the artificial light emitted into each respective space.

The examples discussed so far have included relatively high-level illustrations and discussions of light fixtures 3 and 9 as examples of suitable lighting devices. The lighting devices, whether configured as fixtures, as lamps or as other types of lighting devices, may take a variety of forms or configurations. A lighting device of the type under consideration here, for example, may have one or more sources of any one or more suitable types. Also, the controller may be implemented by a micro-control unit (MCU), a microprocessor, a field programmable gate array, dedicated logic circuitry, etc. If a sensor is included, the sensor could provide feedback as to an operational state or parameter of the lighting device, or the sensor could measure an external condition such as intensity and/or color characteristic(s) of ambient light in the space to be illuminated. Ambient light sensing would detect light from any uncontrolled source that may illuminate the space, such as natural light or a lamp not incorporated into the controlled system. However, ambient light sensing may also detect at least some of the controlled artificial illumination, depending on the location, orientation and/or configuration of the sensor(s) used to detect ambient light in the space.

More specific examples of lighting devices discussed below utilize solid state type light sources. Although LEDs are discussed mainly as the examples of solid state light sources, other solid state devices such as OLEDs may be used instead of or in combination with LEDs.

Most applications of artificial lighting involve white light, that is to say, light that a person would typically perceive as white. In an application of chaotic function control intended to control only intensity of the light, a single intensity controllable white light source would be sufficient. In a solid state lighting device, for example, a single controllable channel of one or more LEDs producing white light could be controlled in intensity at least in part based on the chaotic function.

Many white LEDs today, however, do not produce a particularly good spectral quality of light. For example, many white LEDs tend to emit light that a person perceives as rather blue in color. Combination of white LEDs with other color LEDs improves the spectral characteristic of the white light output of the lighting device. Two or more sets of white LEDs emitting white light of different color temperatures used in combination produce white of a color temperature based on the combined characteristic of the different types of LEDs, which may be better than any one of the types produces alone.

Alternatively, white LEDs can be combined with LEDs emitting somewhat more monochromatic light of one or more colors chosen to essentially correct the color characteristic of the white LEDs. For example, a combination of bluish white light LEDs with green LEDs and/or with red, amber or orange LEDs can produce combined white light of a much more pleasing color characteristic than the bluish white LEDs alone.

The somewhat more monochromatic colors of light emitted by some types of colored LEDs may produce light of a narrow bandwidth around the characteristic color wavelength. To a person, such a color appears relatively pure or highly color saturated. Compared to white sources such as white LEDs, however, somewhat more monochromatic colors of light emitted by some types of colored LEDs may produce light of an intermediate bandwidth around the characteristic color wavelength. The bandwidth of light from this later type of colored LED would typically not be as broad as that of a white light source but would not be as narrow as the bandwidth of the saturated color type LED. To a person, such a color appears pastel.

In a simple design, white LEDs may be combined in a single string or control channel with the alternative type of white LEDS and/or with the somewhat more monochromatic LEDs. In such an arrangement, one control channel would vary the intensity of light output from all of the LEDs that together produce the white light, at least in part in accordance with a chaotic function.

For a white lighting device intended to control a color characteristic instead of or in addition to intensity, including the chaotic control function, the device would include two or more control channels for different LEDs producing light of different color characteristics. The different channels could provide RGB type control of red (R), green (G) and blue (B) LEDs. Other combinations of three or more relatively monochromatic colors may be used.

However, most implementations for general white lighting applications will include at least one channel for white light production, for example, to provide desired white light of suitable intensity in an efficient and cost effective manner. A simple two channel arrangement might use white LEDs of two different types respectively in the two channels. Another two channel approach might use white LEDs (of the same or different types) in both channels, but where one or both channels have additional somewhat more monochromatic LEDs to cause each channel to produce white light but two different color characteristics. Another two-channel approach would use white LEDs in one channel (alone or with corrective color LEDs in the same channel) together with somewhat more monochromatic LEDs in the other channel. In these arrangements, individual control of the intensity of light produced each of the two channels can vary the overall intensity of the light output from the white lighting device as well as one or more color characteristics of the combined light output. As discussed above, such control would include chaotic components, with respect to intensity and/or with respect to the one or more color characteristics of the combined light output.

Figure 11:
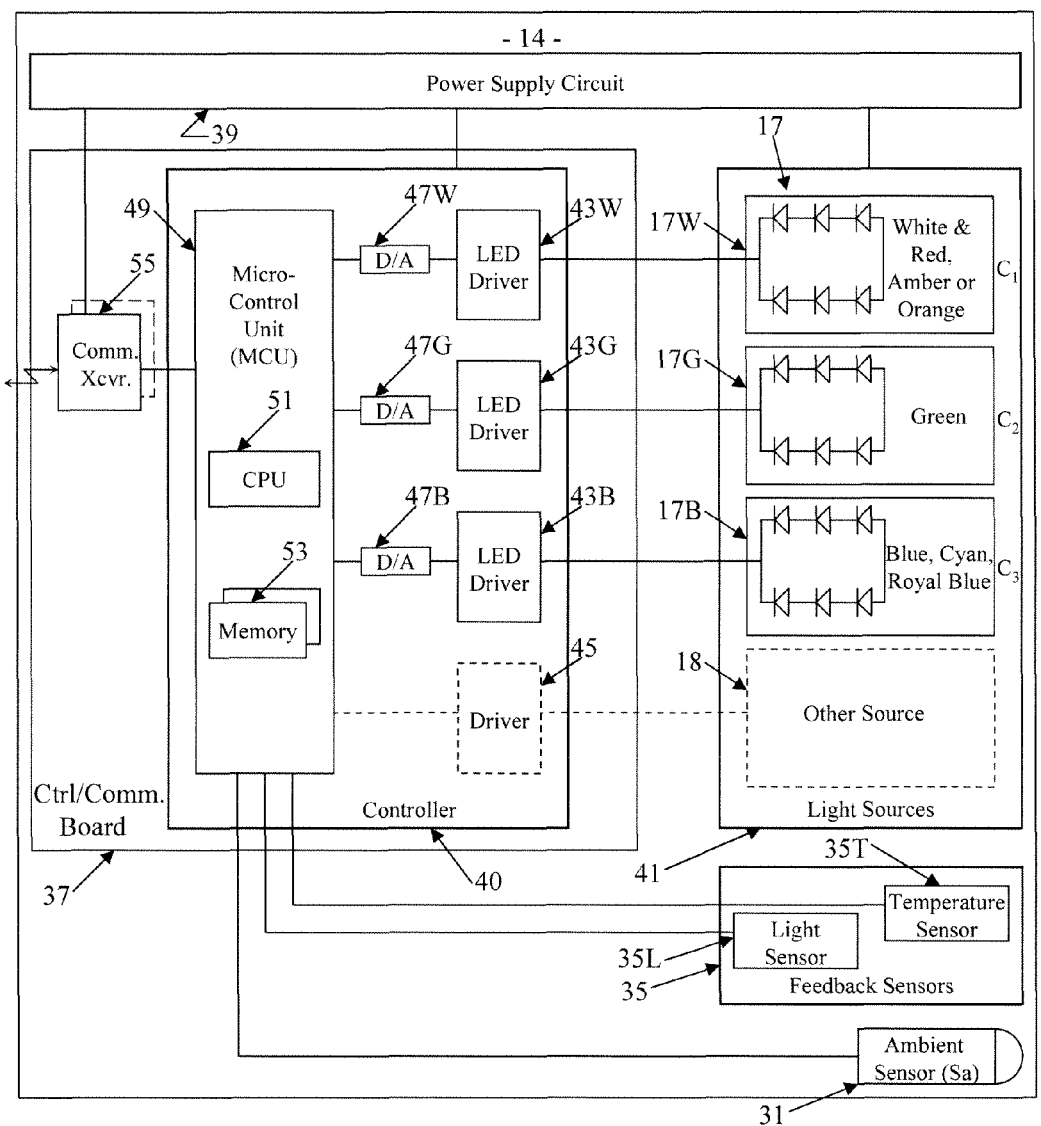
FIG. 11 is a somewhat more detailed block diagram of an example of a light fixture that may be used in the system of FIG. 1 or the system of FIG. 10.

At this point in our discussion, it may be helpful to consider a specific example of a lighting device, again in the form of an exemplary fixture. FIG. 11 is a functional block diagram of a light fixture 14 that utilizes at least a number of solid state sources 17 and may utilize an additional source or sources 18 of another type, such as a more conventional lamp like an incandescent lamp, a halogen lamp or a fluorescent lamp. The other source and its associated driver are shown in dotted line form since they may be omitted, for example, if the solid state sources 17 provide sufficient intensity for the particular lighting application.

In the example of FIG. 11, the fixture 14 includes a set of light sources 41. The present example utilizes solid state sources 17. Although other solid state devices may be used, such as organic light emitting diodes (LEDs), the example includes light emitting diodes (LEDs) as the solid state sources. The fixture 14 may utilize LEDs of two, three or more types, in two, three or more control channels. For example, as noted earlier, some fixtures may use RGB LEDs in three respective control channels. Several of the examples outlined earlier, e.g. with two strings of white or a string for white and a string for another non-white color may be with only two control channels. The example here provides at least three control channels, for three sets of solid state sources; and at least one of the sets of solid state sources in is configured to produce white light.

In the example, the first control channel $C_1$ includes solid state sources for white (W) light emission. Although there could be a single white LED, in the example, the first control channel $C_1$ includes a set of LEDs 17W that together produce white light. The set of LEDs 17W could be LEDs of one white type or two or more types of white LEDs. However, in the example, the set of LEDs 17W includes some white LEDs and a number of somewhat more monochromatic LEDs of one or more types, so that the string of LEDs 17W produces white light of a desirable color temperature and color characteristic(s). For example, together with the actual white LEDs, the set of LEDs 17W may include some number of red LEDs, some number of orange LEDs, some number of amber LEDs, any combination of two or all of these colors of LEDs, or combinations of one to or more of these colors of LEDs with yet further color LEDs. The non-white color LEDs in the set 17W may be configured to produce pastel light of the respective color(s) or light of relatively pure saturated color(s).

As noted, the example here uses three sets of LEDs in three control channels $C_1$ to $C_3$. Although additional sources of additional colors of light may be provided, the example includes two no-white color sources in the form of LED sources of green (G) and relatively blue (B) light. Hence, the array 17 of LEDs includes a green set of LEDs 17G and a blue set of LEDs 17B. Of course, other color LED sets could be used in place of 17G and/or 17B. The additional colors controlled through channels $C_2$ and $C_3$ enable tuning of the color characteristic(s) of the combined white light output of the lighting device 14 as well as chaotic control of the color characteristic(s).

Control of the intensities of the LED outputs from channels $C_1$ to $C_3$ provides control of the intensity of the combined white light output of the lighting device 14 as well as chaotic control of the light output intensity. Although there may be one LED of each color, in the examples, to provide desired intensity and variability, each of the sets of LEDs 17G and 17B include a number of LEDs. Each set may include a single type of LED of the respective color, or one or both sets may include one or more LEDs of each of a plurality of colors. For example, the set of LEDs 17B may include some number of blue LEDs, some number of cyan LEDs, some number of royal blule LEDs, any combination of two or all of these colors of LEDs, or combinations of one to or more of these colors of LEDs with yet further color LEDs generally in the blue light portion of the visible spectrum. The various color LEDs in the sets 17G and 17B may be configured to produce pastel light of the respective color(s) or light of relatively pure saturated color(s). Similar sets of LEDs but of different colors may be used as sources of additional colors of light in the chaotic control of color characteristic(s) of the combined light output of the fixture 14.

An additional source 18 of white light may be included to provide sufficient intensity for a particular general lighting application. If provided, the source 18 may be an additional set of LEDs similar to 17W of the same or different overall white light characteristics, or the source 18 may include one or more conventional devices of other types, as outlined above. Some other types of sources 18, however, such as incandescent or halogen lamps, typically are only readily controllable with respect to intensity, although the color characteristic(s) of the light produced by such a source may vary at relatively low intensity levels, at relatively high intensity levels and/or from source device to source device.

The electrical components shown in the example of FIG. 11 also include a source controller 40. The controller includes drivers corresponding to the particular set of light sources 41. Hence, in the example, the controller 40 includes white, green and blue LED driver circuits 43W, 43G and 43B, respectively. If the fixture includes another source 18, then the controller 40 also includes an appropriate driver 45.

The source controller 40 also includes a micro-control unit (MCU) 49. In the example, the MCU 49 controls the various LED driver circuits 43W, 43G, 43B via respective digital-to-analog (D/A) converters 47W, 47G, 47B. The intensity of the emitted light of a given LED is proportional to the level of current supplied by the respective driver circuit. The current output of each driver circuit is controlled by the higher level logic of the system. The D/A converter 47W controls the driver circuit 43W to provide a drive current to the LEDs 17W for the white first control channel $C_1$ as specified by the MCU 49. Similarly, and the D/A converter 47G controls the driver circuit 43G to provide a drive current to the green LEDs 17G as separately specified by the MCU 49 of the second control channel $C_2$; and the D/A converter 47B controls the driver circuit 43B to provide a drive current to the LEDs 17B for the third control channel $C_3$ as separately specified by the MCU 49; and in such an arrangement, the white light LED output may considered as another control channel C3. If provided as outlined earlier, e.g. for white light or for additional colors or for additional sources of the same or similar light types, other sets of LEDs, forming additional channels, could be controlled/operated in a similar manner.

In operation, one of the D/A converters 47 receives a command for a particular level, from the MCU 49. In response, the converter 47 generates a corresponding analog control signal, which causes the associated LED driver circuit 43 to generate a corresponding power level to drive the particular string of LEDs 17. The LEDs of the string in turn output light of a corresponding intensity. The D/A converter 47 will continue to output the particular MCU specified driver setting level, until the MCU 49 issues a new command to the particular D/A converter 47. Thus, the particular set of LEDs 17 will continue to receive analog current and thus will continue to output light at the set analog level until the MCU 47 changes the applicable setting.

The example of FIG. 11 thus implements a form of analog current control for the LEDs 17, albeit to establish contributions to overall intensity of the combined fixture output light as well as to provide variations of color characteristic(s) and/or intensity in accordance with a chaotic function as discussed above relative to FIGS. 1-10. Of course, other control strategies may be applied to the LED channels, such as pulse width modulation, albeit to achieve similar outputs including chaotic function related variations in characteristic(s) of the fixture output light.

As noted, the MCU 49 controls the other light source 18, if included, via an appropriate source driver 45. For most conventional white light sources, the driver 45 simply turns ON/OFF the source 18 and may set an intensity level for the source output, in response to a command from the MCU 49. The control routine implemented via the programming of the MCU 49 would account for the inclusion of light from source 18 at any given intensity setting, as part of its overall control of the fixture output including chaotic functional variations. The MCU 49 may control the source 18 via the driver 45 as part of the variations. In other configurations, the MCU 49 may leave the driver 45 in a state so that source 18 provides a fairly steady output over time and implement the variations like those discussed earlier via control of the LEDs 17 via the converters 47R-G and the drivers 43R-G.

The MCU 49 in the example of the light fixture 14 is a microchip device that incorporates a processor serving as the programmable central processing unit (CPU) 51 of the MCU and thus of the light fixture 14. The MCU 49 also includes one or more memories 53 accessible to the CPU 51. The memory or memories 53 store executable programming for the CPU 51 as well as data for processing by or resulting from processing of the CPU 51. The CPU implements the program to process data in the desired manner and thereby generate desired control outputs, for example, to control the other elements of the fixture 14 to implement the general lighting application with chaotic function control as discussed herein.

The driver circuits, the A/D converters and the MCU receive power from a power supply 39, which is connected to an appropriate power source (not separately shown in this drawing). The power supply 39 provides AC to DC conversion if necessary, and converts the voltage and current from the source to the levels needed by the various electronic elements on the control and communication (Ctrl./Comm.) board 37. For most lighting applications of the type under consideration here, the power source will be an AC line current source; however, some applications may utilize DC power from a battery or the like. Also, the light fixture 14 may have or connect to a back-up battery or other back-up power source to supply power for some period of time in the event of an interruption of power from the AC mains.

The electrical system associated with the fixture 14, included on the Ctrl/Comm. board 37 also includes one or more communication interfaces 55. If the fixture is used in a network like that of FIG. 10, one communication interfaces 55 would be compatible with and provide data communications via the particular type of network. The same or a different communication interface may be used to provide communication with any local user interface device (like the device 6 in FIG. 1) that may be provided in the space to be illuminated by the fixture 14.

The communication interface 55 may be an optical or electrical wired communication device, or the communication interface 55 may be an optical or radio frequency type wireless communication device. The interface 55 may be a one-way device or a two-way device. For purposes of our discussion, the communications interface 55 allows the MCU 49 to communicate with various input and control elements that may be provided in or around the illuminated space and/or via a network with other fixtures and/or computers or terminals in a networked system implementation.

As noted earlier, a lighting device as discussed herein may include one or more sensors. In the fixture 14 of FIG. 11, the device includes one or more ambient light sensors (Sa) 31. The sensor Sa 31 provides intensity and/or color characteristic information regarding ambient lighting, as a condition input to the control logic, implemented in this example by the MCU 49. The sensor Sa 31 detects light from any uncontrolled source that may illuminate the space, such as natural light or a lamp not incorporated into the controlled system. However, ambient light sensor Sa 31 may also detect at least some of the controlled artificial illumination from the sources 17, 18, depending on the location, orientation and/or configuration of the ambient light sensor(s) Sa 31 relative to the illuminated space.

The programming of the CPU 51 configures the MCU 49 to control one or more characteristics of the visible combined light output of the fixture 14 based on the sensed ambient lighting, potentially including one or more aspects of the chaotic function-based variation. For example, when sensing high intensity day light in the space with chaotic variations, the MCU 49 may reduce the intensity of the light output of the fixture 14, reduce the magnitude of variation and/or adjust the timing of the variations of the artificial lighting produced by the chaotic control functionality. Instead of such inverse-phase control of the characteristics of the artificial component of the lighting in the space, sensor responsive adjustment may produce in-phase changes. For example, when the sensor(s) Sa 31 indicate an increase in intensity of daylight in the space, the MCU 49 may increase the intensity of the light output of the fixture 14, increase the magnitude of variation and/or change the timing of the variations of the artificial lighting produced by the chaotic control.

The electrical components of the light fixture 14 may also include one or more feedback sensors 35, to provide system performance measurements as feedback signals to the control logic, implemented in this example by the MCU 49. A variety of different feedback sensors may be used, alone or in combination, for different applications.

A temperature sensor 35T, for example, would provide feedback regarding operating temperature of system elements, such as one or more of the LEDs 17. If provided, the temperature sensor 35T may be a simple thermo-electric transducer with an associated analog to digital converter, or a variety of other temperature detectors may be used. The temperature sensor 35T is positioned on or inside of the fixture 14, typically at a point that is near the LEDs 17 or other source(s) 18 that produce most of the system heat. The temperature sensor 35T provides a signal representing the measured temperature to the MCU 49. The system logic, here implemented by the MCU 49, can adjust intensity of one or more of the sets of LEDs 17 in response to the sensed temperature, for example, to allow the MCU 49 to adjust driver current(s) appropriately so as to achieve programmed LED outputs even though temperatures of the LEDs may vary with time of continuous system operation.

As another example, the fixture 14 may include one or more light responsive feedback sensors 35L. The light feedback sensor 35L differs from the ambient light sensor 31 in that sensor 35L is positioned or oriented to mainly detect light produced by the sources 17 and/or 18 of the fixture 14 and little or no light from external sources; whereas at least a substantial amount of light sensed by the ambient light sensor may be from one or more external sources, at least during particular times of day. A sensor 35L, for example, may be positioned to sense light within an optical integrating cavity that mixes the outputs from the LEDs 17 and the source(s) 18 to form the combined light output of the fixture 14. A light sensor 35 may sense intensity and/or a color characteristic of the light produced in or by the system 14 or 11B. Intensity feedback, for example, may be used to adjust drive current to the LEDs 17. Color characteristic feedback may be used to adjust the drive currents to combinations of LEDs 17 to adjust the characteristic of the combined light output of the fixture 14. Feedback from the light sensor 35L may also be used to adjust timing of light emissions, for example, to help insure synchronization of chaotic variations by a number of similar fixtures illuminating the same space.

A fixture 14 may be implemented using a variety of optical and electrical housing elements. For example, it was mentioned briefly earlier that the fixture may utilize an optical integrating cavity to combine light from the various sources 17 and/or 18 to form the light output of the fixture 14. Other types of optical mixers may be used instead of the optical integrating cavity. Various reflectors or deflectors may be added to direct the output light in a manner appropriate for a particular illumination application. The fixture housing may facilitate a flush ceiling or wall mount, may allow the fixture to hang from a wall or be mounted on but extending out from a wall, etc. As noted in earlier discussions, however, even the fixture configuration is shown and described by way of example, since the concepts of chaotic functional control of lighting can be implemented in other types of lighting devices.

In a lighting device that utilizes a programmable device in the controller, such as a microprocessor or an MCU like 49, the relevant control functionality is defined by the executable instructions that program the CPU of the programmable device. The chaotic function control can be programmed into such a device as part of the initial construction or installation of a lighting device. Alternatively, the chaotic function control may be retrofitted into an existing fixture, device or system, for example, by updating the control program for the relevant controller(s). Generally, the discussion above has focused on techniques and equipment for implementing the chaotic function control of lighting. However, where a programmable controller is used, the chaotic function control may also be embodied in the control program for the device.

In this regard, a program product or 'article of manufacture' may take the form of a machine or computer readable medium in combination with the relevant program instructions embodied in the medium. Non-transitory forms of such a medium, for example, include various types of memories that may be used in the controllers to store programs for use by the CPUs as well as various types of disk storage media that might be used to hold the programming before downloading through a network for installation in a particular controller.

For information about additional examples of white lighting fixtures and associated controllers that may be programmed or otherwise configured in accordance with the discussion herein, attention may be directed to U.S. Utility patent application Ser. No. 13/218,148, Filed Aug. 25, 2011, entitled "TUNABLE WHITE LUMINAIRE," the disclosure of which is entirely incorporated herein by reference.

The concepts outlined above are susceptible to a wide range of variation within the general range of the exemplary teachings herein. As an example of variants of the concepts outlined above, the user interface provided in the occupied/illuminated space may offer a greater degree of individual control. The specific examples described earlier provided ON/OFF and/or dimming type examples. The interface may also allow control of color characteristic(s) of the illumination in the space. Also, for some installations, it may be preferable to provide control over the chaotic function variations. For example, an occupant in one room may prefer less variation in lighting than an occupant in another room. Hence, the user interface might allow occupants in each of the rooms to individually control the chaotic function related variations in the different rooms.

As noted earlier, the technologies discussed in the examples may be applied to control lighting of spaces intended for other biological occupants in addition to or instead of humans. Examples of application with respect to other biological life forms include lighting applications for plants and animals, aquatic life forms, insects, etc. The lighting may help to increase growth and yield. As another example, the lighting may also help to contain animals or drive away animals or insects.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A lighting device, comprising:
   at least one controllable source of visible light configured to illuminate a space to be utilized by one or more biological occupants; and
   at least one controller coupled to the at least one source of visible light,
   wherein the at least one controller is configured to control operation of the at least one source of visible light so as to vary at least one characteristic of visible light emitted from the at least one source into the space over a period of time at least in part in accordance with a chaotic function.

2. The lighting device of claim 1, wherein the at least one controller is configured, to vary the operation of the at least one source of visible light in such a manner that the at least one characteristic of the visible light emitted from the at least one source into the space varies over the period of time at least in part in accordance with the chaotic function, so as to effect perception by the one or more occupants in a manner that promotes an objective purpose of the space when occupied.

3. The lighting device of claim 1, wherein the lighting device is a single light fixture including the at least one source of visible light and the at least one controller.

4. A system comprising a plurality of the lighting devices of claim 1, wherein the controllers in the lighting devices are configured to control operations of the sources in the lighting devices in a coordinated manner to vary the at least one characteristic of total visible light emitted by the sources into the space over the period of time at least in part in accordance with the chaotic function.

5. The system of claim 4, further comprising:
   a network, wherein:
   each of the lighting devices further comprises a communication interface configured to enable communication via the network; and
   the communications via the network facilitates the control operations of the sources in the lighting devices in said coordinated manner to vary the at least one characteristic of total visible light emitted by the sources into the space over the period of time at least in part in accordance with the chaotic function.

6. The lighting device of claim 1, wherein the at least one characteristic of visible light that varies includes one or more light characteristics selected from the group consisting of: intensity of light, spectral content of light, polarization of light, color temperature of light, and chromaticity difference (Delta_uv) of light from the Planckian locus.

7. The lighting device of claim 1, wherein the at least one characteristic of visible light that varies comprises intensity of light and at least one color characteristic of light.

8. The lighting device of claim 7, wherein the at least one color characteristic of light includes one or more color characteristics selected from the group consisting of: spectral content of light, color temperature of light, and chromaticity difference (Delta_uv) of light from the Planckian locus.

9. The lighting device of claim 1, wherein:
   the at least one source of visible light comprises at least one first source configured to emit visible light of a first color characteristic and at least one second source configured to emit visible light of a second color characteristic different from the first color characteristic, and
   the at least one controller is configured to control the first and second sources to vary a color characteristic of combined visible light emitted by the sources into the space over the period of time at least in part in accordance with the chaotic function.

10. The lighting device of claim 9, wherein the varied color characteristic of combined visible light emitted by the sources into the space is a color characteristic selected from the group consisting of spectral content of light, color temperature of light, and chromaticity difference (Delta_uv) of light from the Planckian locus.

11. The lighting device of claim 1, wherein the at least one controller is further configured to limit extent of the variation in accordance with the chaotic function to less than or equal to a predetermined maximum amount.

12. The lighting device of claim 1, wherein the at least one controller is further configured to limit rate of the variation in accordance with the chaotic function to less than or equal to a predetermined maximum rate.

13. The lighting device of claim 1, wherein the at least one controller is configured to control operation of the at least one source of visible light so that the at least one characteristic of the visible light emitted from the at least one source into the space varies in accordance with a combination of a nominal function over the period of time and the chaotic function.

14. The lighting device of claim 12, wherein the combination of the nominal function and the chaotic function approximates a natural variation of at least one characteristic of visible light.

15. The lighting device of claim 1, wherein the at least one controller is further configured to control operation of the at least one source of visible light so that the at least one characteristic of the visible light varies in accordance with the chaotic function in a state that is unstable with attractors.

16. The lighting device of claim 1, wherein the chaotic function comprises a mathematical expression that determines the variation of the at least one characteristic in a dynamic manner that appears random or lacking in order.

17. The lighting device of claim 16, wherein the expression is dynamic and highly sensitive to an initial condition.

18. A method, comprising steps of:
operating an electrically driven source to emit visible light, to illuminate a space to be utilized by one or more biological occupants; and
controlling a variation of at least one characteristic of the visible light emitted from the source over a period of time at least in part in accordance with a chaotic function.

19. The method of claim 18, wherein the variation in accordance with the chaotic function is configured to effect perception by the one or more occupants in a manner that promotes an objective purpose of the space when occupied.

20. The method of claim 18, wherein a coefficient of the chaotic function has a value that configures the chaotic function in a state that is unstable with attractors, for at least part of the period of time.

21. The method of claim 18, wherein the controlling step comprises varying the at least one characteristic of the visible light from the source in accordance with a combination of a nominal function over the period of time and the chaotic function.

22. The method of claim 21, wherein the combination of the nominal function and the chaotic function approximates a natural variation of at least one characteristic of visible light.

23. The method of claim 18, further comprising:
sensing a characteristic of ambient light in the space,
wherein the controlling of the variation of at least one characteristic of the visible light emitted from the source is at least partially responsive to the sensed characteristic of ambient light in the space.

24. An article of manufacture, comprising a non-transitory machine readable medium and instructions embodied in the medium for configuring a programmable controller of a lighting device to implement the method of claim 18.

25. The method of claim 18, wherein the chaotic function comprises a mathematical expression that determines the variation of the at least one characteristic in a dynamic manner that appears random or lacking in order.

26. The method of claim 25, wherein the expression is dynamic and highly sensitive to an initial condition.

* * * * *